United States Patent
Grassel et al.

(10) Patent No.: US 9,449,154 B2
(45) Date of Patent: *Sep. 20, 2016

(54) METHOD AND APPARATUS FOR GRANTING RIGHTS FOR CONTENT ON A NETWORK SERVICE

(71) Applicant: Nokia Corporation, Espoo (FI)

(72) Inventors: Guido Peter Grassel, Espoo (FI); Niko Tapani Kiukkonen, Veikkola (FI)

(73) Assignee: Nokia Technologies Oy, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 14/733,430

(22) Filed: Jun. 8, 2015

(65) Prior Publication Data

US 2015/0269361 A1    Sep. 24, 2015

Related U.S. Application Data

(63) Continuation of application No. 12/916,271, filed on Oct. 29, 2010, now Pat. No. 9,135,664.

(51) Int. Cl.
```
G06F 21/10      (2013.01)
G06Q 10/10      (2012.01)
G06Q 50/00      (2012.01)
G06Q 50/18      (2012.01)
H04L 29/06      (2006.01)
H04L 29/08      (2006.01)
H04L 12/58      (2006.01)
```

(52) U.S. Cl.
CPC ............ *G06F 21/10* (2013.01); *G06Q 10/101* (2013.01); *G06Q 50/01* (2013.01); *G06Q 50/184* (2013.01); *H04L 51/32* (2013.01); *H04L 63/10* (2013.01); *H04L 67/02* (2013.01); *G06F 2221/0713* (2013.01)

(58) Field of Classification Search
CPC ........... G06F 21/10; G06F 2221/0713; H04L 51/32; H04L 63/10; H04L 67/02; G06Q 50/184; G06Q 50/01; G06Q 10/101
See application file for complete search history.

(56) References Cited

U.S. PATENT DOCUMENTS

| 6,829,569 | B1 | 12/2004 | Drucker et al. |
|---|---|---|---|
| 7,047,030 | B2 | 5/2006 | Forsyth |
| 7,730,216 | B1 | 6/2010 | Issa et al. |

(Continued)

FOREIGN PATENT DOCUMENTS

| AU | 2006240147 A1 | 11/2006 |
|---|---|---|
| CN | 1770169 A | 5/2006 |

(Continued)

OTHER PUBLICATIONS

Trimeche et al., Digital rights management for visual content in mobile applications, Mar. 2004, First International Symposium on Control, Communications and Signal Processing, pp. 95-98.*

(Continued)

*Primary Examiner* — Kenneth Chang
(74) *Attorney, Agent, or Firm* — Ditthavong & Steiner, P.C.

(57) ABSTRACT

Techniques for granting rights for content on a social network to multiple users include determining first data. It is also determined to associate a first user identifier and at least a second user identifier with the first data. It is further determined to grant a right for the first data to a first user identified by the first user identifier and at least a second user identified by the second user identifier.

20 Claims, 13 Drawing Sheets

(56) References Cited

U.S. PATENT DOCUMENTS

| | | |
|---|---|---|
| 7,797,740 B2 | 9/2010 | Blom et al. |
| 7,832,003 B2 | 11/2010 | Kelly et al. |
| 7,873,988 B1 | 1/2011 | Issa et al. |
| 2002/0023132 A1 | 2/2002 | Tornabene et al. |
| 2002/0174179 A1 | 11/2002 | Toyota et al. |
| 2004/0067770 A1 | 4/2004 | King et al. |
| 2005/0027560 A1 | 2/2005 | Cook |
| 2005/0198031 A1 | 9/2005 | Pezaris et al. |
| 2005/0289642 A1 | 12/2005 | Pacholec et al. |
| 2006/0101019 A1 | 5/2006 | Nelson et al. |
| 2006/0132304 A1 | 6/2006 | Cabell |
| 2006/0242068 A1* | 10/2006 | Jogand-Coulomb ... G06F 21/78 705/50 |
| 2006/0248573 A1 | 11/2006 | Pannu et al. |
| 2006/0248584 A1 | 11/2006 | Kelly et al. |
| 2008/0034040 A1 | 2/2008 | Wherry et al. |
| 2008/0195956 A1 | 8/2008 | Baron et al. |
| 2008/0275884 A1 | 11/2008 | Yoshida et al. |
| 2009/0005024 A1 | 1/2009 | Kato |
| 2009/0070426 A1 | 3/2009 | McCauley et al. |
| 2009/0070684 A1 | 3/2009 | Aldrich et al. |
| 2009/0070852 A1 | 3/2009 | Chijiiwa et al. |
| 2009/0177670 A1 | 7/2009 | Grenier et al. |
| 2009/0216859 A1 | 8/2009 | Dolling |
| 2009/0249491 A1* | 10/2009 | Miura ...................... G06F 21/10 726/26 |
| 2009/0265278 A1* | 10/2009 | Wang ...................... G06F 21/10 705/54 |
| 2010/0015975 A1 | 1/2010 | Issa et al. |
| 2010/0158374 A1 | 6/2010 | Anand et al. |
| 2010/0205179 A1 | 8/2010 | Carson et al. |
| 2010/0250618 A1 | 9/2010 | Ourega |
| 2010/0269158 A1 | 10/2010 | Ehler et al. |
| 2010/0312714 A1 | 12/2010 | Ourega |

FOREIGN PATENT DOCUMENTS

| | | |
|---|---|---|
| CN | 101167093 A | 4/2008 |
| CN | 101523786 A | 9/2009 |
| EP | 2062385 A2 | 5/2009 |
| KR | 20080011217 A | 1/2008 |
| WO | 2006115919 A2 | 11/2006 |
| WO | 2007086015 A2 | 8/2007 |
| WO | 2008060739 A2 | 5/2008 |
| WO | 2009076755 A1 | 6/2009 |

OTHER PUBLICATIONS

International Patent Search for International Patent Applicaiton No. PCT/FI2011/050823 dated Feb. 20, 2012, pp. 1-5.
International Written Opinion for related International Patent Application No. PCT/FI2011/050823 dated Feb. 20, 2012, pp. 1-9.
Squicciarini et al., "Privacy Policies for Shared Content in Social Network Sites", VLDB Journal, Dec. 2010, vol. 19, Issue 6, Springer-Verlag New York, Inc. Secaucus, NJ, USA, pp. 1-2.
Alim et al., "Data Retrieval from Online Social Network Profiles for Social Engineering Applications", Nov. 2009, International Conference for Internet Technology and Secured Transactions, pp. 1-5.

* cited by examiner

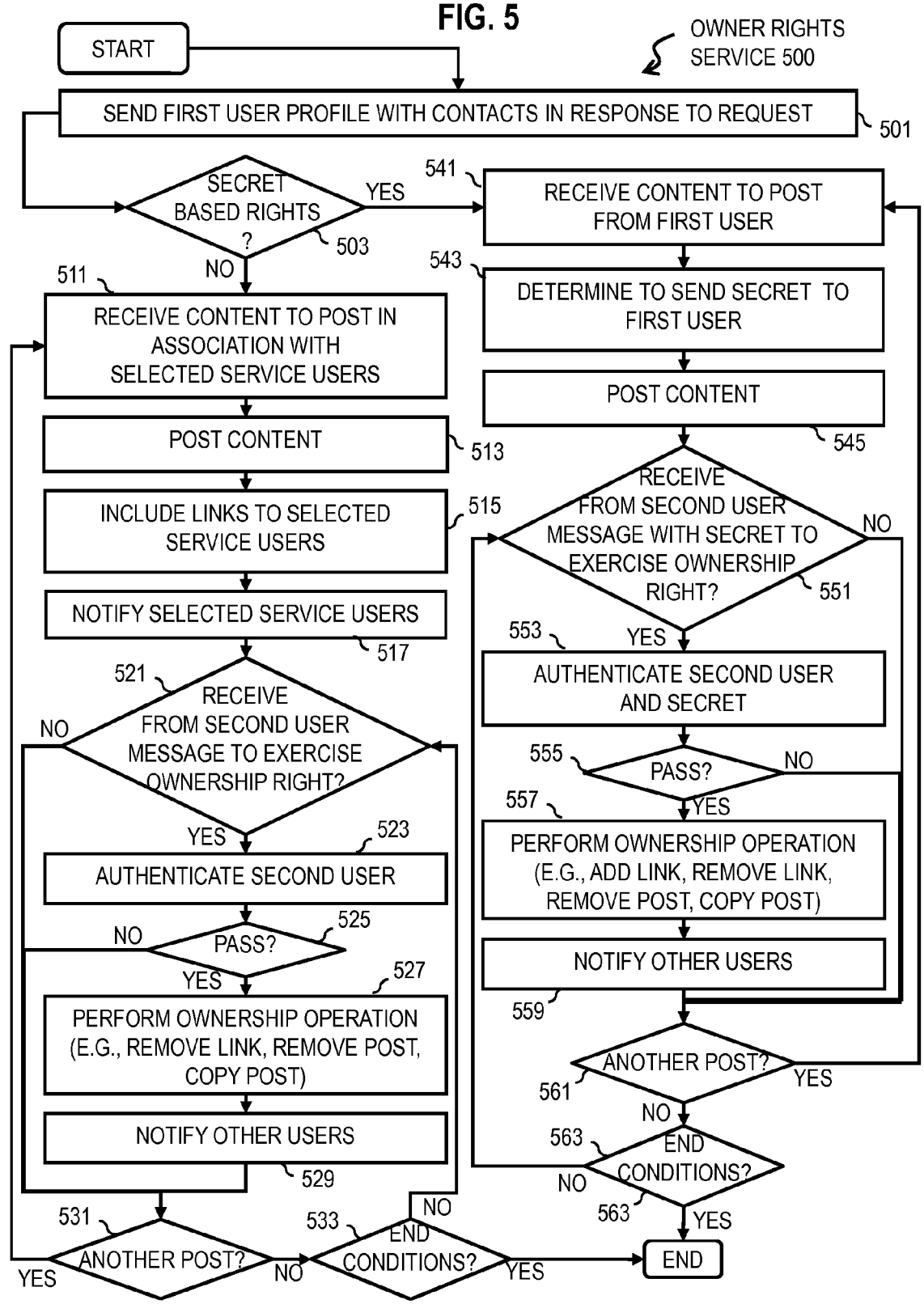

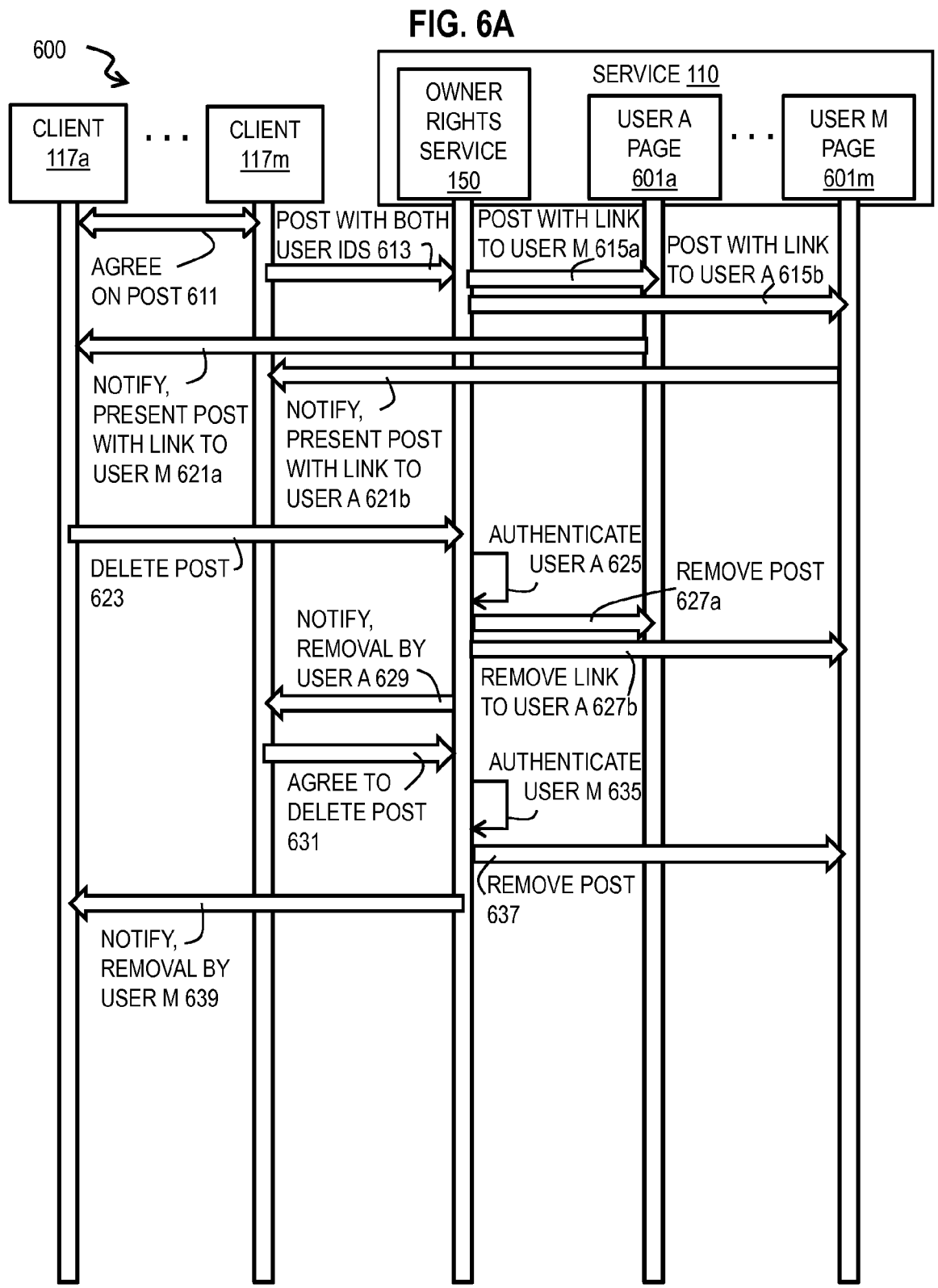

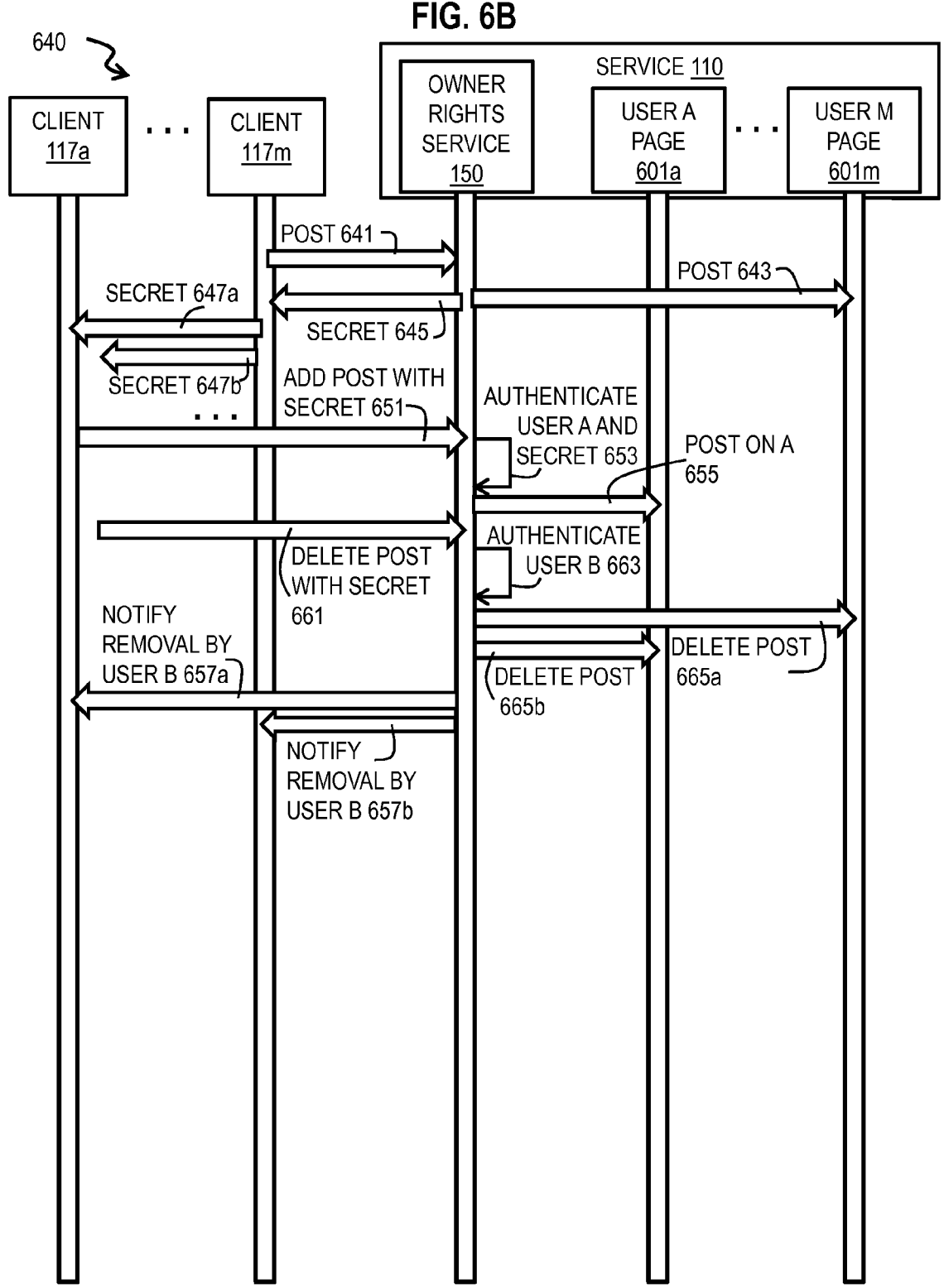

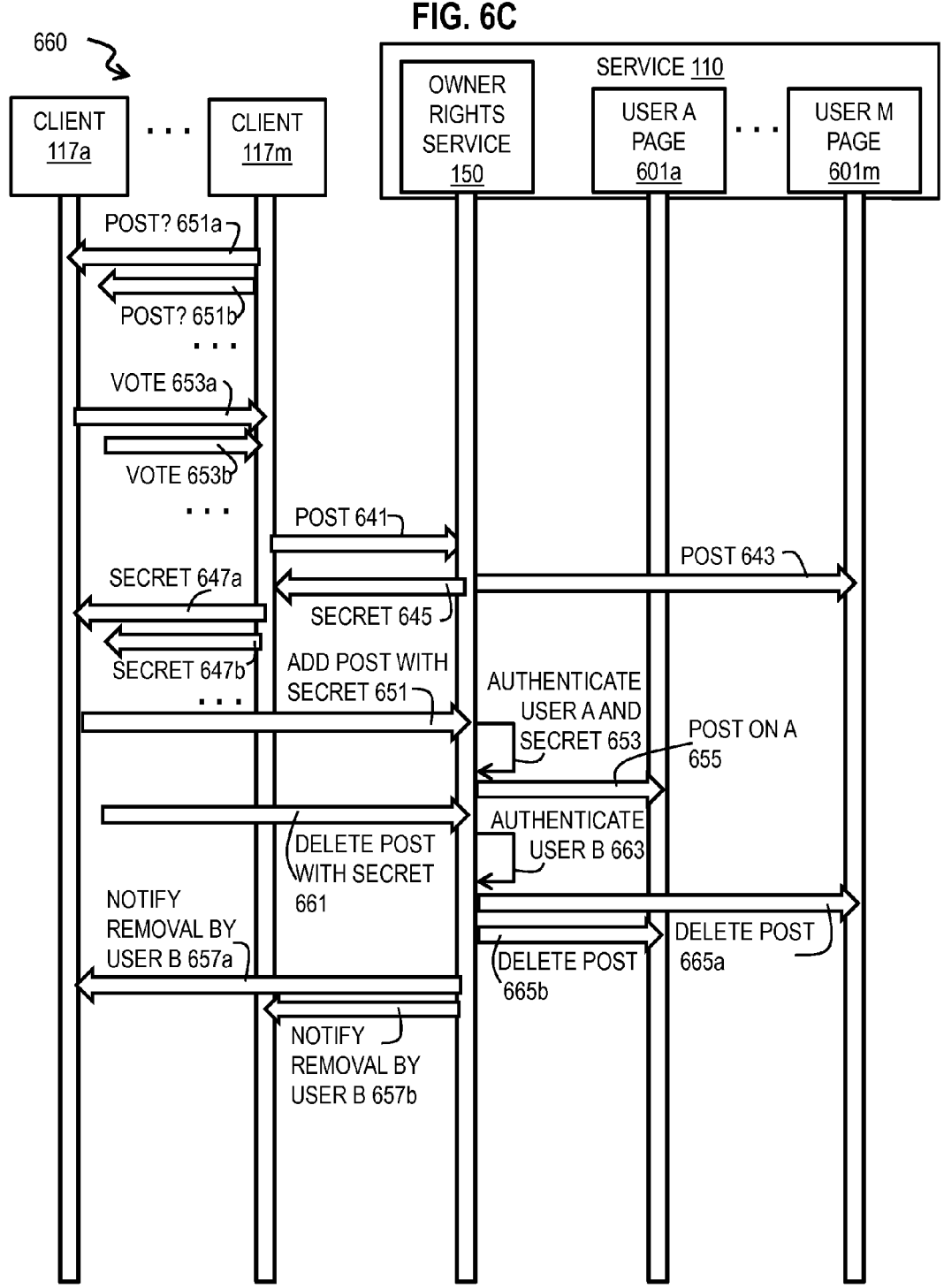

METHOD AND APPARATUS FOR GRANTING RIGHTS FOR CONTENT ON A NETWORK SERVICE

This application is a continuation of U.S. application Ser. No. 12/916,271, filed Oct. 29, 2010, which is herein incorporated by reference in its entirety.

BACKGROUND

Service providers and device manufacturers (e.g., wireless, cellular, etc.) are continually challenged to deliver value and convenience to consumers by, for example, providing compelling network services. A popular type of network service is a social network which allows multiple users to share content provided by one or more of the users. Often the shared content reflects on the behavior of persons other than the user who uploaded the content to the service. While a person who uploaded the content can often copy it, remove it from the service, or exercise other rights of ownership, other persons whose behavior is reflected may be unable to do so.

SOME EXAMPLE EMBODIMENTS

Therefore, there is a need for an approach for granting, to multiple users, ownership rights for content on a network service, such as a social network service.

According to one embodiment, a method comprises determining first data. The method further comprises determining to associate a first user identifier and at least a second user identifier with the first data. The method further comprises determining to grant a right for the first data to a first user identified by the first user identifier and at least a second user identified by the second user identifier.

According to another embodiment, a method comprises receiving a first user identifier associated with first data; and determining to present the first data in association with the first user identifier. The method further comprises receiving data that indicates a different second user identifier and exercise of a right for the first data. The method further comprises determining whether the second user has the right for the first data. The method further comprises determining to operate on the first data based on the right, if the second user has the right for the first data.

According to another embodiment, a method comprises facilitating access to at least one interface configured to allow access to at least one service, the at least one service configured to perform all or part of the above methods.

According to another embodiment, an apparatus comprises at least one processor, and at least one memory including computer program code, the at least one memory and the computer program code configured to, with the at least one processor, cause, at least in part, the apparatus to perform all or part of the above methods.

According to another embodiment, a computer-readable storage medium carries one or more sequences of one or more instructions which, when executed by one or more processors, cause, at least in part, an apparatus to perform all or part of the above methods.

According to another embodiment, an apparatus comprises means for performing all or part of the above methods.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 5 is a flowchart of a process at a network service for granting ownership rights, according to one embodiment;

FIGS. 6A-6C are time sequence diagrams of messages to grant and exercise ownership rights in content posted at a service, according to various embodiments;

DESCRIPTION OF SOME EMBODIMENTS

Examples of a method, apparatus, and computer program are disclosed for granting to multiple users rights (e.g., an ownership right, an access right, a use right, or other rights) for content on a service. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

As used herein content refers to any data that can be generated, acquired or communicated over a network, including text, images, documents, spreadsheets, audio, video, application data, game data, maps, drawings, among others. Posting refers to any process for making content available for viewing by others on user equipment or other devices in communication over a network. In some contexts, post or posting is used as a noun to refer to the content posted. A user refers to an entity (e.g., person or organization) who operates user equipment in communication with a communications network. A subscriber refers to a user who has registered with a service available through the network. A contact refers to a different user with whom the user communicates over the network, such as another subscriber of the same service as indicated in a contacts list associated with a subscriber in a subscriber profile data structure.

Although various embodiments are described with respect to granting to multiple users rights to delete content posted on a social network, it is contemplated that the approach described herein may be used with other ownership rights, such as copying, tagging, commenting, distributing and excluding others from using content on social network services or other services available through a communications network, such as an electronic mail service or a database service.

Figure 1:
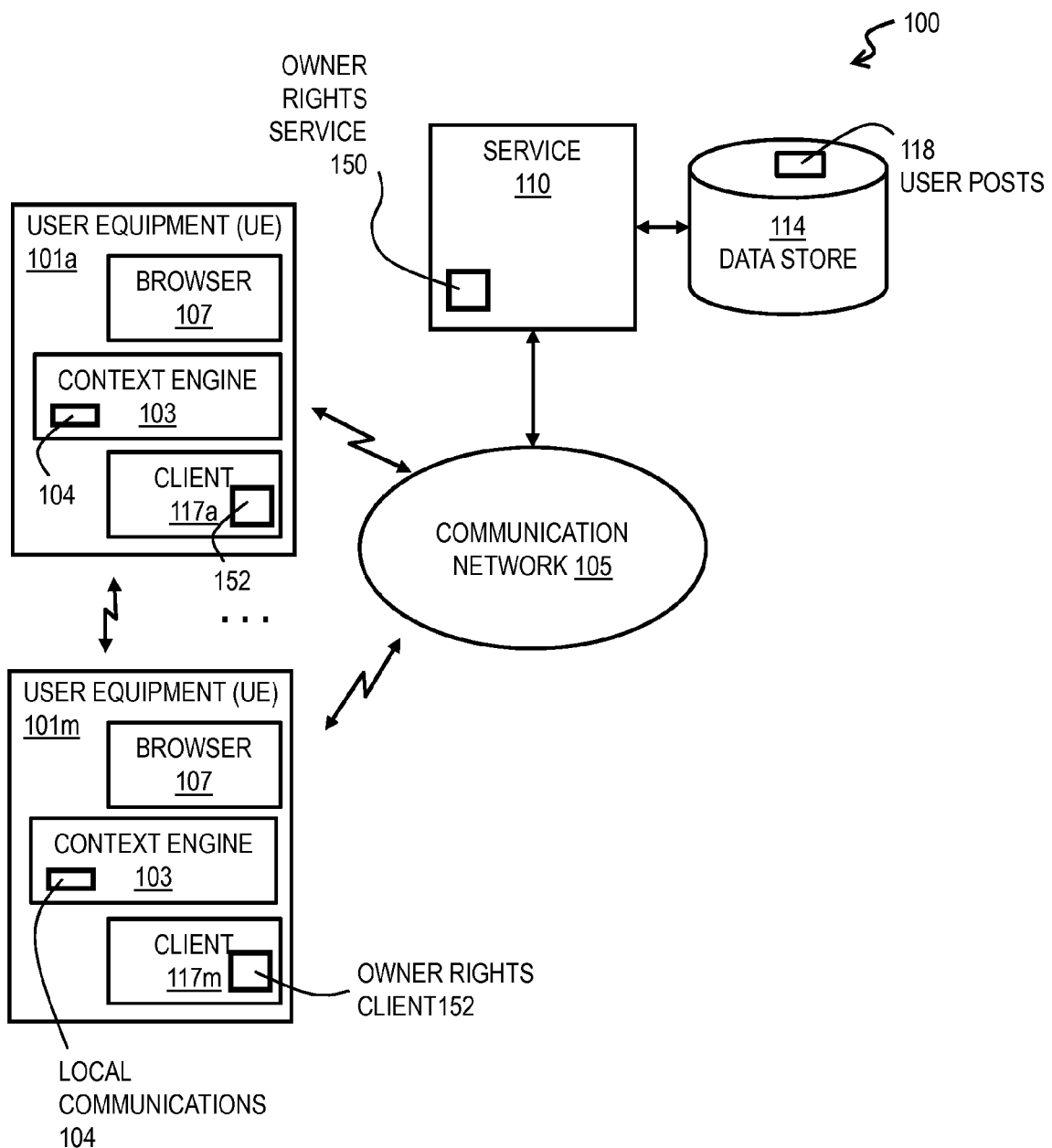
FIG. 1 is a diagram of a system capable of granting ownership rights for content posted at a service, according to one embodiment.

FIG. 1 is a diagram of a system 100 capable of granting ownership rights for content posted at a service, according to one embodiment. Client processes 117a through 117m (collectively referenced hereinafter as clients 117) on corresponding user equipment (UE) 101a through 101m (collectively referenced hereinafter as user equipment, UE 101) of corresponding multiple users are in communication with service 110 through communication network 105. Information about the subscribers of service 110 is stored in data store data structure 114, and includes any content posted by those subscribers in user posts data structure 118. Often the content in user posts 118 reflects on the behavior of persons (e.g., User A of UE 101a) other than the subscriber (e.g., User M of UE 101m) who uploaded the content to the service 110. While User M who uploaded the content can often copy it, remove it from the service, or exercise other rights of ownership, User A whose behavior is reflected may be unable to do so. For example, an image posted by User M in user posts data structure 118, and available to at least some other subscribers of service 110, may depict User M and User A drinking at a bar. However, User A may know another subscriber, User X, of service 110 who has access to the posted image and who is avoiding alcohol use with User A's support. User A would like to remove the image from the user posts data structure 118. However, because User A did not post the image, the service 110 gives User A no right to remove the image.

To address this problem, the system 100 of FIG. 1 introduces the capability to grant, to multiple users, rights for content posted at a service. Although various embodiments are discussed with respect to ownership rights, it is contemplated that system 100 is applicable to any rights available with respect to content (e.g., an access right, a use right, etc.). Each of the clients 117 includes an owner rights client module 152 that determines multiple subscribers who are given ownership rights. The service 110 includes an owner rights service module 150 that honors those extended ownership rights for subscribers who did not post the content. The ownership rights include, copying the content to the subscriber's posts, excluding a particular subscriber from accessing or copying the content, removing the content from the subscriber's posts, adding links or comments or tags of the subscriber to the post, removing links or comments or tags of the subscriber from the post, removing the content from the posts of one or more or all other users, removing links or comments or tags of others from the post, among other rights, alone or in some combination. Thus, the ownership right includes a right to remove first data (content) from the service.

As shown in FIG. 1, the system 100 comprises user equipment (UE) 101 having connectivity to service 110 via a communication network 105. By way of example, the communication network 105 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

In some embodiments, one or more of the UE 101 include context engines 103 that determine the current environment of the UE 101, such as a device identifier, installed equipment, current time, current connectivity to network 105 including signal strength and noise levels, power levels, and processes currently executing. In some embodiments, the context engine 103 includes a local communications module 104, which determines and communicates with other user equipment within local communication by virtue of sufficiently close spatial proximity. For example, as depicted in FIG. 1, mobile UE 101a and mobile UE 101m are in local communication through the local communications module 104, as indicated by the double-headed zig-zag arrow between them.

By way of example, the UE 101 and service 110 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

Processes executing on various devices, often communicate using the client-server model of network communications, widely known and used. According to the client-server model, a client process sends a message including a request to a server process, and the server process responds by providing a service. The server process may also return a message with a response to the client process. Often the client process and server process execute on different computer devices, called hosts, and communicate via a network using one or more protocols for network communications. The term "server" is conventionally used to refer to the process that provides the service, or the host on which the process operates. Similarly, the term "client" is conventionally used to refer to the process that makes the request, or the host on which the process operates. As used herein, the terms "client" and "server" and "service" refer to the processes, rather than the hosts, unless otherwise clear from the context. In addition, the process performed by a server can be broken up to run as multiple processes on multiple hosts (sometimes called tiers) for reasons that include reliability, scalability, and redundancy, among others. A well known client process available on most devices (called nodes) connected to a communications network is a World Wide Web client (called a "web browser," or simply "browser") that interacts through messages formatted according to the hypertext transfer protocol (HTTP) with any of a large number of servers called World Wide Web (WWW) servers that provide web pages. As depicted in FIG. 1, the UEs 101 include browsers 107.

Although processes and data structures of system 100 are depicted as integral blocks arranged on particular nodes connected to network 105 for purposes of illustration, in other embodiments, one or more processes or data structures or portions thereof are arranged in a different way or in one or more databases on the same or different nodes, or one or more other processes or data structures are included, or the system is changed in some combination of ways. Thus, it is contemplated that the functions of these components may be combined in one or more components or performed by other components of equivalent functionality. For example, in some embodiments, the service 110 interacts with a user of UE 101 through a browser 107 and client 117 is omitted. In such embodiments, the owner rights client module 152 is embedded in a web page presented by browser 107, and thus inside browser 107.

Figure 2A:
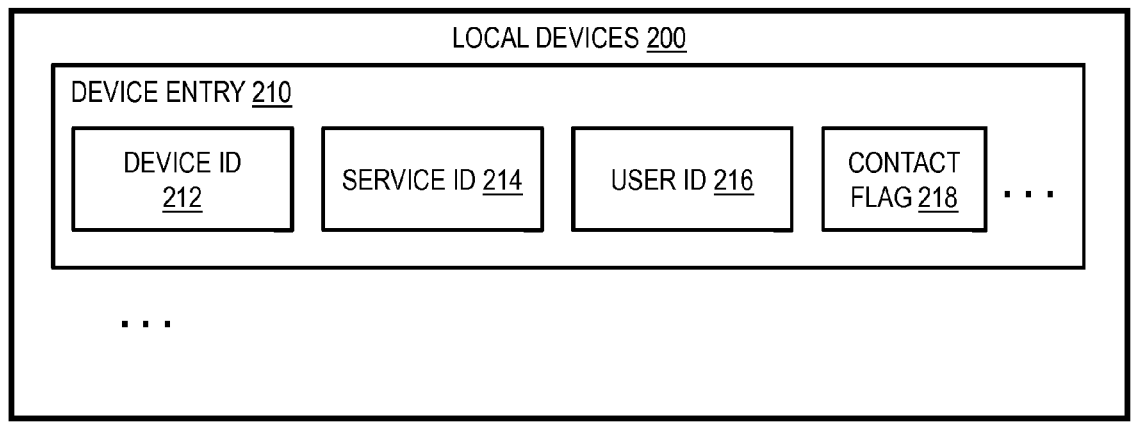
FIG. 2A is a diagram of a data structure for tracking nearby service subscribers, according to one embodiment.

In some embodiments, ownership rights are granted to one or more subscribers in local communication with the subscriber who posts content to the service. FIG. 2A is a diagram of a local devices data structure 200 for tracking nearby social network users, according to one embodiment. In some embodiments, one or more fields of data structure 200 are included in owner rights client module 152 or context engine 103 or both. In some embodiments that do not grant ownership rights based on such local communications, local device data structure 200 is omitted.

Figure 2B:
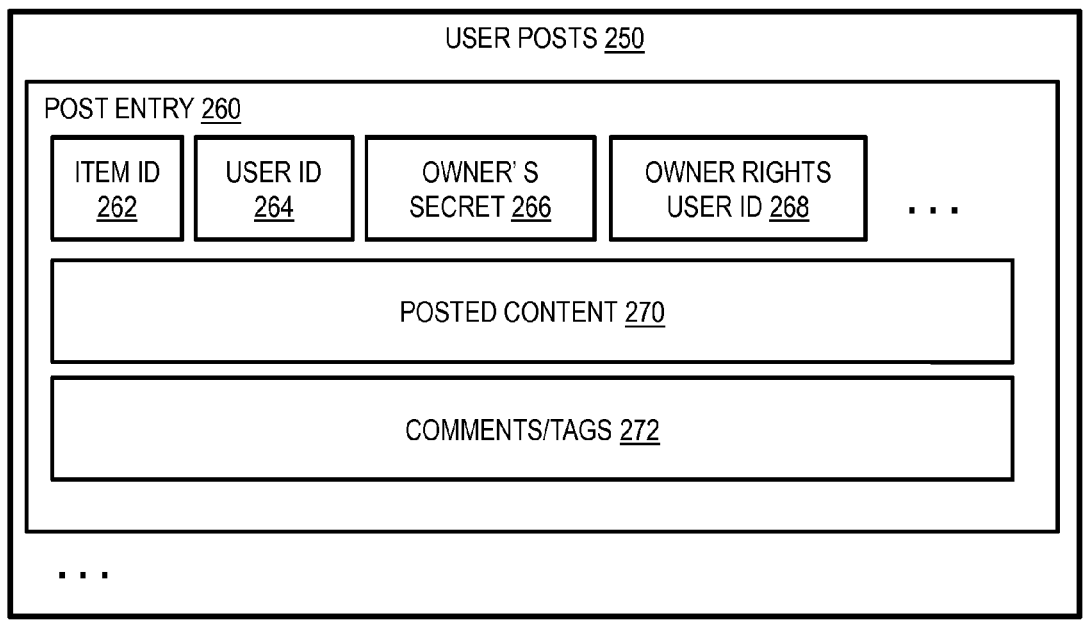
FIG. 2B is a diagram of a data structure for content posted by service users, according to one embodiment.
Figure 3:
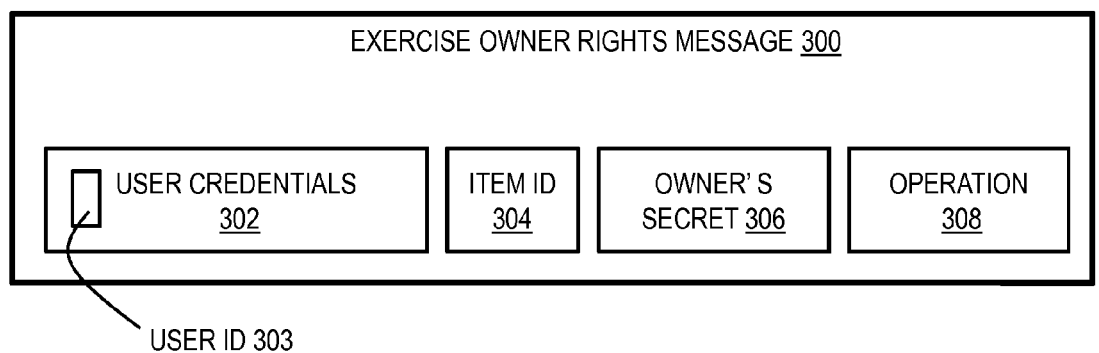
FIG. 3 is a diagram of a message for exercising ownership rights in posted content, according to one embodiment.

Although data structures, messages and fields are depicted in FIG. 2A, and in subsequent diagrams in FIG. 2B and FIG. 3, as integral blocks arranged in a particular order for purposes of illustration, in other embodiments, one or more messages or data structures or fields or portions thereof are arranged in a different order or in one or more databases on the same or different nodes, or one or more other fields are included, or the data structure or message is changed in some combination of ways.

The local devices data structure 200 includes a device entry field 210 for each device detected to be in local communications, e.g., direct radio contact, or in mutual radio contact with a common wireless fidelity (WiFi) access point or cellular base station, by the local communications module 104. Other fields 210, if any, are indicated by ellipsis. Each device entry field 210 includes a device identifier (ID) field 212, and, for one or more services for which a user of the device is a subscriber, a service identifier (ID) field 214, a user identifier field 216 and a contact flag field 218. Fields 214, 216 and 218 for other services are indicated by ellipsis.

The device ID field 212 holds data that uniquely indicates a different mobile UE 101 that is in direct (e.g., near-field) communication with the local UE 101 on which resides the data structure 200. For purposes of illustration, it is assumed that local devices data structure 200 is on local UE 101m that is in local communication with different UE 101a. In such circumstances, device ID field 212 holds data that uniquely identifies different UE 101a, such as a Media Access Control (MAC) number for the different UE 101a, a Mobile Subscriber Integrated Services Digital Network Number (MSISDN), a 64 bit International Mobile Subscriber Identity (IMSI), among others, alone or in some combination.

The service ID field 214 holds data that uniquely indicates a service (e.g., service 110) to which a user of the different UE 101a is a subscriber, among all other services available over the communications network 105. For example, the service ID field 214 holds data that indicates a universal resource identifier (URI) for the service 110.

The user ID field 216 holds data that indicates the subscriber identifier for the user of the different UE 101a indicated in field 212 at the service indicated in field 214. For purposes of illustration, it is assumed that User A of UE 101a has a user ID of "Alice123" at service 110; therefore, user ID field 216 holds data that indicates "Alice123."

The contact flag field 218 holds data that indicates whether the user ID indicated in field 216 is a contact of the user of the local UE 101m at the service indicated in field 214. For example, if User M of the local UE 101m is a subscriber of service 110 and includes Alice123 among the contacts in User M's profile at service 110, then contact ID flag field 218 indicates that the other user is a contact, e.g., indicates the logical value "TRUE." However, if User M of the local UE 101m is a subscriber of service 110 but does not include Alice123 among the contacts in User M's profile at service 110, or if User M is not a subscriber to service 110, then contact ID flag field 218 indicates that the other user is a not a contact, e.g., indicates the logical value "FALSE."

The device entry field 210 is an example means of achieving the advantage of tracking contacts of a user who are in local communication with the user's UE 101. In some embodiments, one or more such contacts are given ownership rights automatically in content posted by the user, as described in more detail below. Granting ownership rights to such contacts is an example means of automatically identifying other subscribers whose behavior may be reflected in content posted by the user.

FIG. 2B is a diagram of a user posts data structure 250 for content posted by service users, according to one embodiment. User posts data structure 250 is a particular embodiment of user posts data structure 118 depicted in FIG. 1. The user posts data structure 250 includes a post entry field 260 for each post provided by a user of the service. Other posts by the same or different user are indicated by ellipsis. In the illustrated embodiment, each post entry field 260 includes an item identifier (ID) field 262, a user identifier (ID) field, an owner's secret field 266, one or more owner rights user identifier (ID) fields 268 and ellipsis, a posted content field 270, and a comments/tags field 272.

The item ID field 262 holds data that uniquely indicates a particular post among all other posts to the same service, e.g., service 110. For example, each new post is given a next number in a sequence of numbers. In some embodiments, the item ID of a deleted post is returned as the next or other number of the sequence of numbers.

The user ID field 264 holds data that uniquely indicates a subscriber to the service, e.g., to service 110, who provided the content for the post indicated in item ID field 262. For purpose of illustration, it is assumed that User M provided an image as content for item ID 1234567 and that User M has a user ID at service 110 of "Myself789." In this circumstance, field 262 indicates 1234567 and field 264 indicates "Myself789."

The owner's secret field 266 holds data that is shared between the service and the subscriber identified in field 264 and called the owner's secret. In some embodiments, the data is exchanged with the subscriber identified in field 264 using encryption to maintain the data as a secret during open communications; but, in other embodiments, encryption is not used even though the data is referred to as the owner's secret for convenience. In some embodiments, the owner's secret is used to allow a subscriber who bears the secret to exercise one or more rights of an owner on the content of the post, as described in more detail below. In some embodiments, the owner's secret field 266 includes different secrets for different ownership rights, e.g., one secret value for copying rights and a different secret value for removal rights. The owner's secret field is an example means of achieving the advantage of granting ownership rights to multiple users, because any subscriber who presents the owner's secret is allowed to exercise the corresponding ownership right. The subscriber identified in field 264 is enabled to distribute the owner's secret to other subscribers, as explained in more detail below with reference to FIG. 4. In some embodiments, an owner's secret is not used and field 266 is omitted.

The owner rights user ID field 268 holds data that indicates a subscriber who is different from the one indicated in field 264, and who has been granted ownership rights. In some embodiments the subscriber indicated in field 268 is granted all rights of ownership. In some embodiments, only some rights of ownership are granted; and, in some of these embodiments, the ownership rights granted are indicated in the field 268 along with the user ID of the subscriber. For example, if User M wishes to grant ownership rights to User A, whose user ID at service 110 is "Alice123," then data indicating "Alice123" is included in field 268. Other subscribers who are granted ownership rights in the content of the current post are indicated in subsequent fields 268 indicated by ellipsis. A bona fide message from User A to operate on the content of the current post is granted based on User A's user ID being present in one of the fields 268, as explained in more detail below with reference to FIG. 5. The owner rights user ID field 268 is an example means of achieving the advantage of granting ownership rights to multiple users, because any subscriber whose user ID appears in one of the fields 268 is allowed to exercise the corresponding ownership right. In some embodiments that include fields 268, secret field 266 is omitted. In some embodiments that include owner's secret field 266, owner rights user ID fields 268 are omitted.

The posted content field 270 holds data that indicates the content that has been posted to the service for presentation in association with the subscriber indicated in field 264, e.g., an image of User A and User M at a bar which is to be presented by the service 110 in association with "Myself789."

The comments/tags field 272 holds data that indicates the comments or tags or links, or some combination, if any, associated with the content by the subscriber indicated in field 264 and any other subscriber with the right to insert comments or tags or links. Each comment or tag or link is associated with the subscriber who provided it.

FIG. 3 is a diagram of a message 300 for exercising ownership rights in posted content, according to one embodiment. The exercise owner rights message 300 includes a user credentials field 302, an item ID field 304, an owner's secret field 306 and an operation field 308.

The user credentials field 302 holds data that authenticates a subscriber to the service 110 who wishes to exercise an ownership right granted by another subscriber. For example, the user credentials field 302 holds data that indicates a token issued by an authentication service. In some embodiments, the user credentials field 302 includes a user identifier (ID) field 303 that holds data that indicates the user ID of a subscriber at the service 110. In some embodiments, the user credentials field 302 includes the user identifier (ID) field 303 and a password field used to authenticate the subscriber at the service. For example, when User A wants to exercise ownership rights over the post by User M, message 300 is sent by User A. In this example, the user credentials field 302 holds data that indicates the user ID "Alice123" of User A in field 303 and a password used to authenticate User A at service 110.

The item ID field 304 holds data that uniquely identifies an individual post on the service over which an ownership right is to be exercised. For example, item ID field 304 holds data that indicates the item ID 1234567 for the post of the image of User A and user M at a bar.

The owner's secret field 306 holds data that indicates the value in the owner's secret field 266 for the associated post. In embodiments that omit field 266, field 306 is also omitted.

The operation field 308 holds data that indicates an operation on the content that is allowed by the ownership rights granted to the use who sends the message 300. For example, in various embodiments, the operation indicates copying the content to the sending subscriber's page, adding a link to the post to the sending subscriber's page, adding a tag or link indicating another subscriber into field 272, deleting a comment or tag or link by another from field 272 of the post, deleting the post content field 270, or deleting the post entry field 260, among others.

Figure 4:
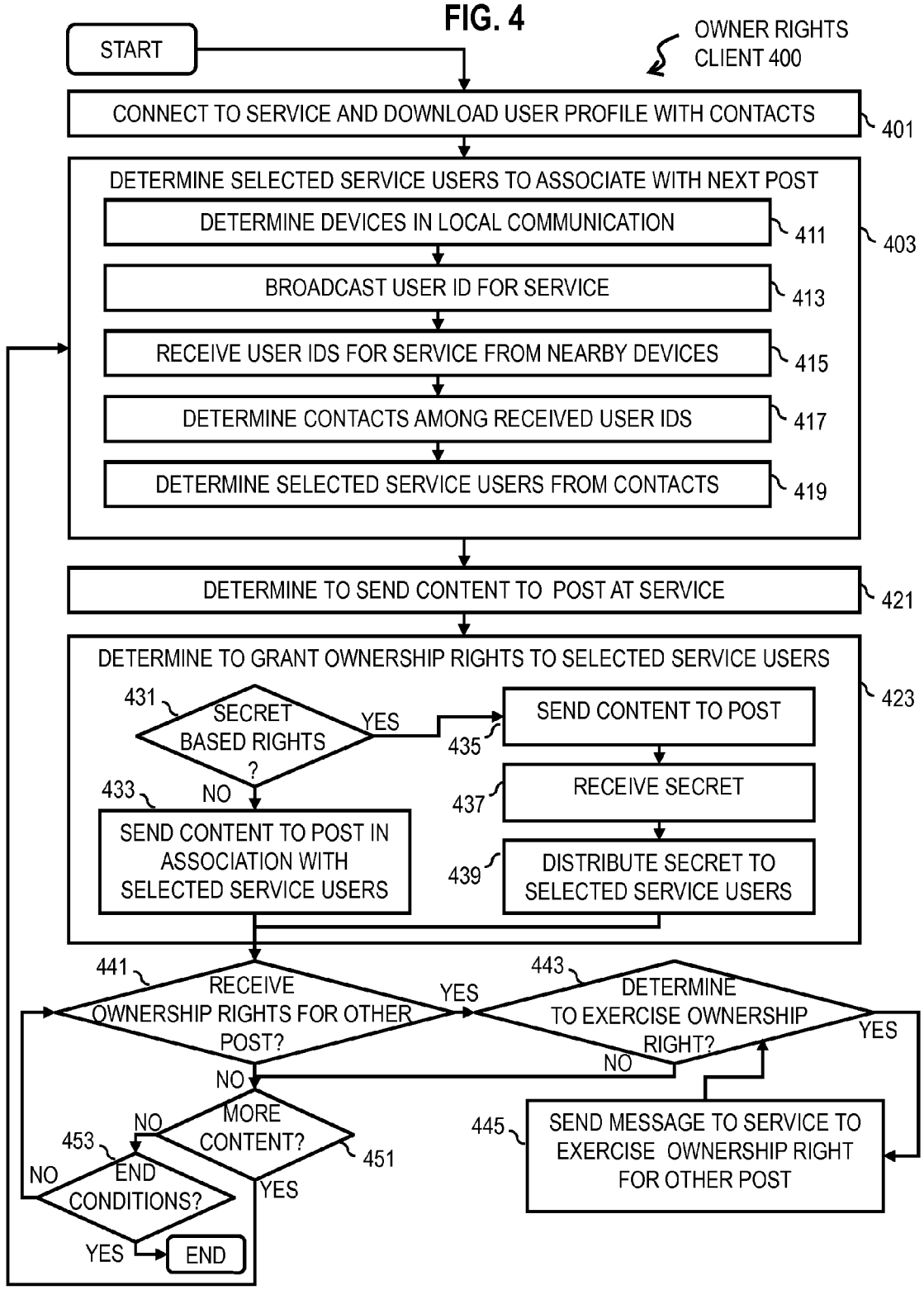
FIG. 4 is a flowchart of a process on user equipment for granting ownership rights, according to one embodiment.
Figure 9:
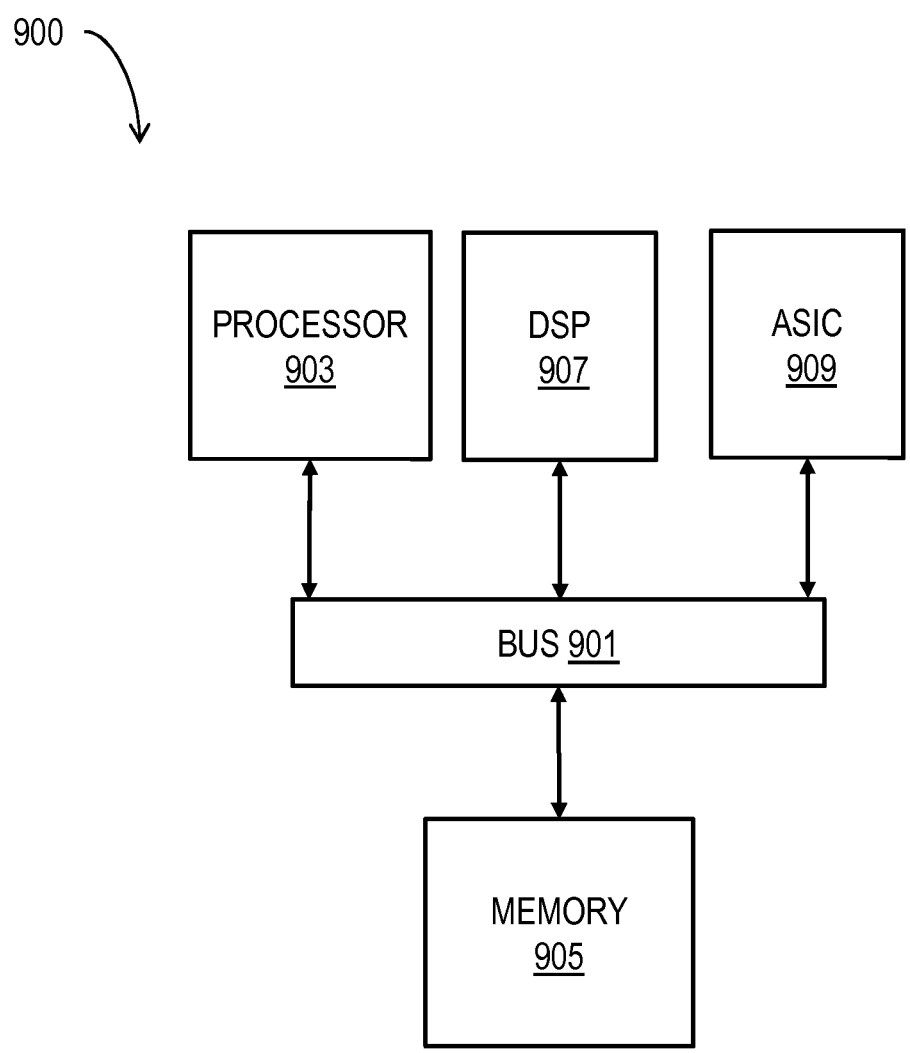
FIG. 9 is a diagram of a chip set that can be used to implement an embodiment of the invention.
Figure 10:
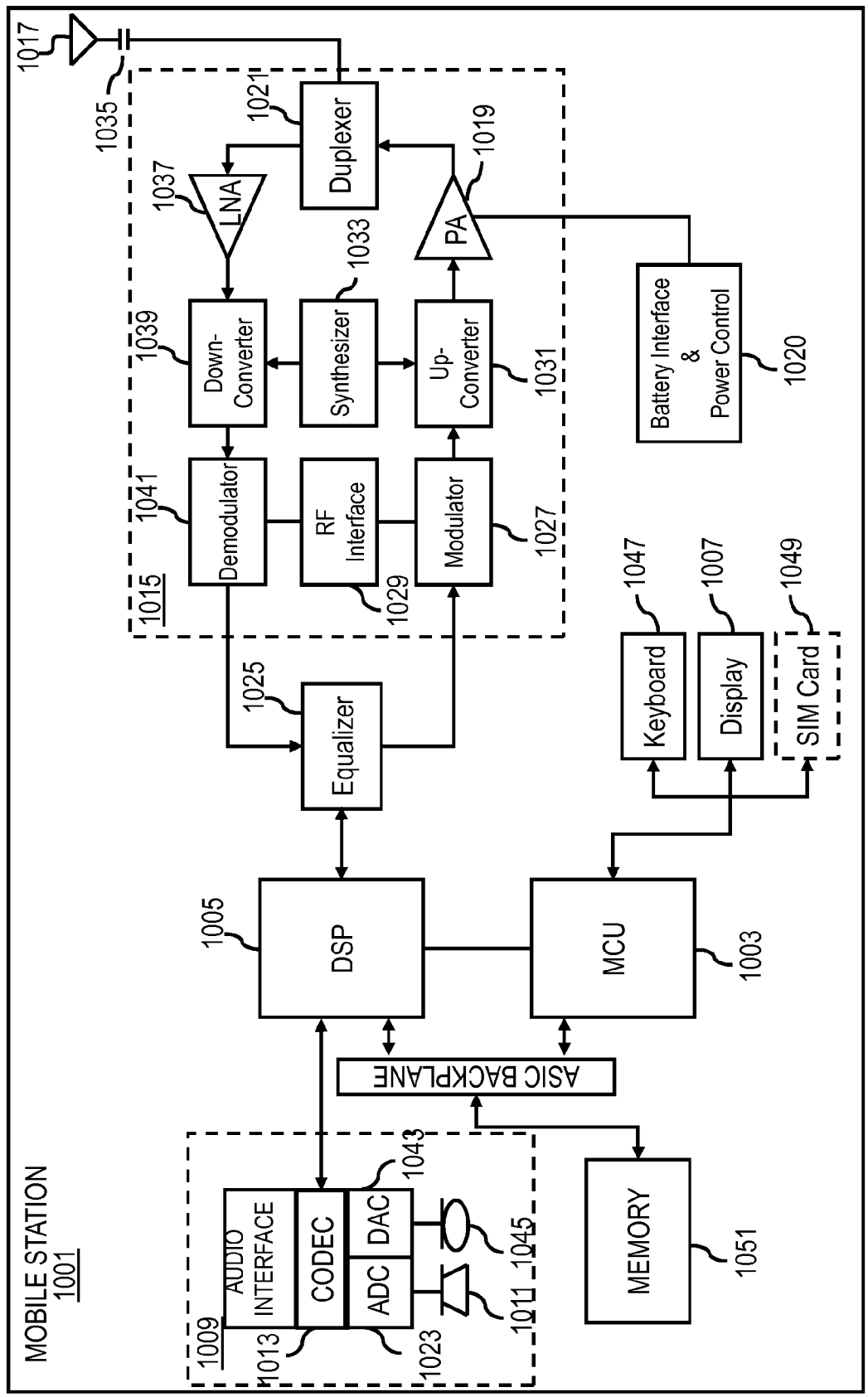
FIG. 10 is a diagram of a mobile terminal (e.g., handset) that can be used to implement an embodiment of the invention.

FIG. 4 is a flowchart of a process 400 on user equipment for granting ownership rights, according to one embodiment. In one embodiment, the client 117 and owner rights client module 152 performs the process 400 and are implemented in, for instance, a chip set including a processor and a memory as shown in FIG. 9 or mobile terminal as depicted in FIG. 10. Although steps are shown in FIG. 4, and subsequent flow chart FIG. 5, as integral blocks in a particular order for purposes of illustration, in other embodiments one or more steps, or portions thereof, are performed in a different order, or overlapping in time, in series or in parallel, or are omitted, or one or more additional steps are included, or the process is changed in some combination of ways.

In step 401, the client 117 connects to the service 110 and downloads the user profile for the user of the UE 101 on which the client 117 executes, called the local user hereinafter. The user profile includes user IDs for any subscribers of service 110 who are contacts of the local user, and any groups of contacts that have previously been defined by the local user, such as a group of family members, a group of work colleagues, a group of former classmates, etc. who are subscribers to the service 110. In some embodiments, step 401 includes providing credentials of the local user for authentication by the service, e.g., receiving a manually input password in response to a prompt and sending the local user's user ID and password to the service 110. For purpose of illustration, it is assumed that process 400 executes on UE 101m of User M, who is the local user; and, User M's profile and contacts and groups, if any, are received during step 401, including User M's user ID "Myself789." During step 401 an application user interface (UI) is presented to the local user by the client 117 of service 110, as described with reference to FIG. 7A.

Figure 7A:
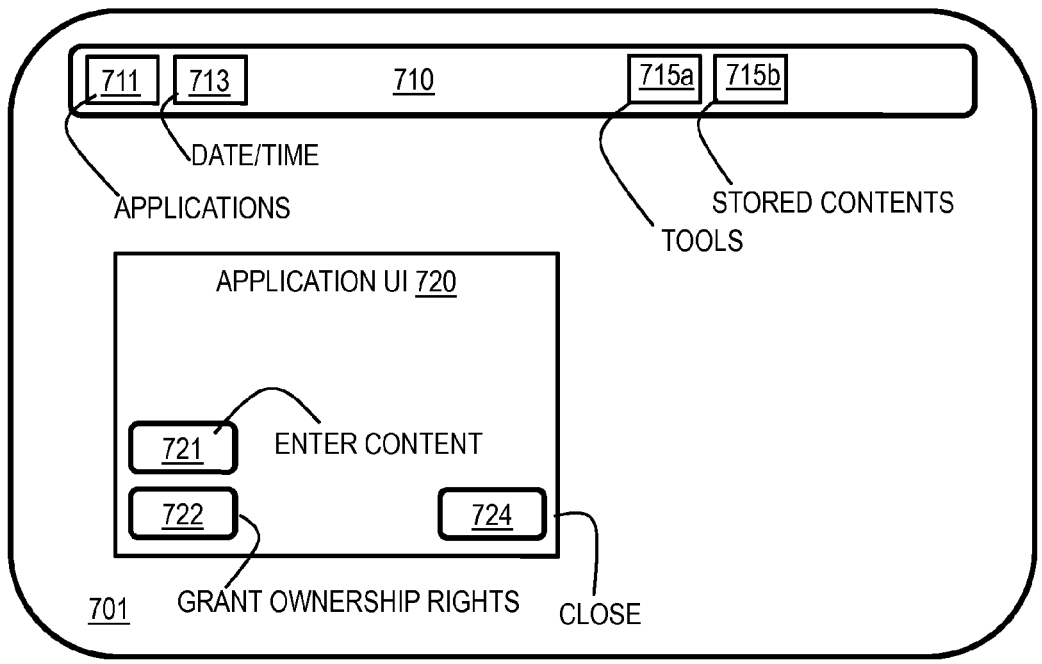
FIGS. 7A-7D are diagrams of user interfaces utilized in the processes of FIG. 4, according to various embodiments.

FIGS. 7A-7D are diagrams of user interfaces utilized in the processes of FIG. 4, according to various embodiments. FIG. 7A is a diagram that illustrates an example screen 701 presented at UE 101. The screen 701 includes a device toolbar 710 portion of a display, which includes zero or more active areas. As is well known, an active area is a portion of a display to which a user can point using a pointing device (such as a cursor and cursor movement device, or a touch screen) to cause an action to be initiated by the device that includes the display. Well known forms of active areas are stand alone buttons, radio buttons, check lists, pull down menus, scrolling lists, and text boxes, among others. Although areas, active areas, windows and tool bars are depicted in FIG. 7A through FIG. 7D as integral blocks in a particular arrangement on particular screens for purposes of illustration, in other embodiments, one or more screens, windows or active areas, or portions thereof, are arranged in a different order, are of different types, or one or more are omitted, or additional areas are included or the user interfaces are changed in some combination of ways.

For purposes of illustration, it is assumed that the device toolbar 710 includes active areas 711, 713, 715a and 715b. The active area 711 is activated by a user to display applications installed on the UE 101 which can be launched to begin executing, such as an email application or a video player or the client 117 of service 110. The active area 713 is activated by a user to display current context of the UE 101, such as current date and time and location and signal strength. In some embodiments, the active area 713 is a thumbnail that depicts the current time, or signal strength for a mobile terminal, or both, that expands when activated. The active area 715a is activated by a user to display tools built-in to the UE, such as camera, alarm clock, automatic dialer, telephone contact list, GPS, and web browser. The active area 715b is activated by a user to display contents stored on the UE, such as pictures, videos, music, voice memos, etc.

The screen 701 also includes an application user interface (UI) area 720 in which the data displayed is controlled by a client 117 or a browser 107 in response to service 110 after user credentials have been entered in response to a prompt for such credentials, like a username and password. According to some embodiments, the application UI area 720 includes an ENTER CONTENT button 721, a GRANT OWNERSHIP RIGHTS button 722 and a CLOSE button 724. If the user activates the CLOSE button 724, the application UI area 720 is closed.

If the user activates the ENTER CONTENT button 721, the user is prompted to enter or select content to be posted to the service. Any method may be used to generate the content, such as presenting a UI that includes a browse button for searching for extant content on the UE 101, or a text box to enter text, or a camera to take an image or video, etc. If the user activates the GRANT OWNERSHIP RIGHTS button 722, the user is presented with or prompted to enter or select one or more contacts of the user at the service 110 to whom one or more ownership rights are to be granted.

Returning to FIG. 4, in step 403, selected service users (subscribers) of service 110 who are to be associated with and given ownership rights in the next content posted at the service 110 by the local user are determined. Any method may be used to determine the selected subscribers of service 110. In some embodiments, the selected subscribers are determined based on input from the local user identifying the selected subscribers one by one from a list of the local user's contacts. In some embodiments, the selected subscribers are determined based on input from the local user identifying one of the predefined groups of contacts, such as colleagues or family as described in more detail below with reference to FIG. 7B. In some embodiments, the predefined groups are dynamically determined, e.g., the subscriber contacts who are in the spatial vicinity or in local communication. Thus step 403 includes determining a first user identifier and a second user identifier associated with first data (content), wherein the first user identifier and the second user identifier identify users of a service available over a communications network. Furthermore, in some embodiments, determining the first user identifier and the second user identifier further comprises determining that the first user identifier and the second user identifier are members of a predefined group of user identifiers on the service. As indicated above, in some embodiments, determining the first user identifier and the second user identifier further comprises determining that a first device associated with the first user identifier and a second device associated with the second user identifier are within a predetermined distance of each other.

Figure 7B:
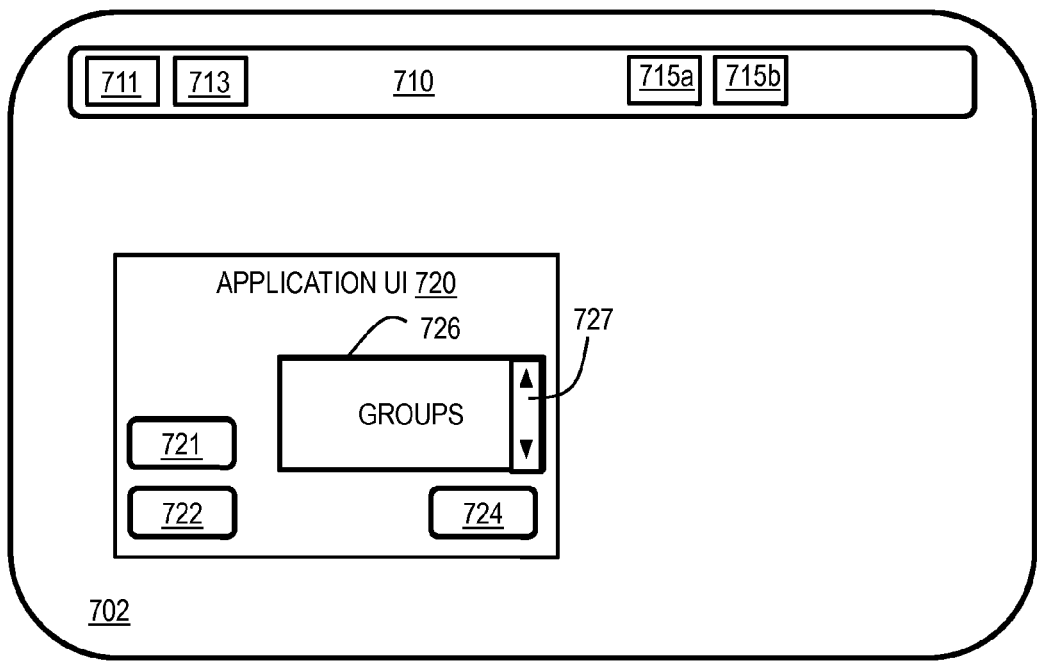

FIG. 7B is a diagram that illustrates an example screen 702 presented at UE 101 to present the user contacts after activating the GRANT OWNERSHIP RIGHTS button 722. Screen 702 includes the device toolbar 710 portion, application UI 720 and buttons 721, 722, 724, as described above. In screen 702, the application UI area 720 includes a contact groups listing area 726 with a scrollbar to move into view contact groups that are too numerous to display in area 726 at one time. The contact groups listing area 726 presents all the contact groups of the user at service 110, including references to groups with dynamically determined memberships.

In some embodiments, the selected subscribers are determined based on input from the local user identifying the selected subscribers from a list of the local user's contacts who are in a spatial vicinity of the local user, as determined by the current position of the local user and the contacts; and, in some embodiments all the local user's contacts in the spatial vicinity are automatically selected. In some embodiments, the selected subscribers are determined based on input from the local user identifying the selected subscribers from a list of the local user's contacts who are in a similar context as the local user, as determined by the context engines of the local user and the contacts as reported to the service; and, in some embodiments all the local user's contacts in the similar context are automatically selected.

In an illustrated embodiment, the selected subscribers are determined based on input from the local user identifying the selected subscribers from a list of the local user's contacts whose UE 101 are in local communication with the local user's UE 101*m*, e.g., as determined by the local communications module 104; and, in some embodiments all the local user's contacts in local communication are automatically selected. Referring again to FIG. 4, in such embodiments, step 403 includes one or more of steps 411 through 419. Including one or more of the local user's contacts whose UE are in local communication is an example means of achieving the advantage of automatically selecting contacts who are likely to be included in the subject matter of the local user's status update posts (SUP), whether text, image, audio, video, or other content, and who therefore deserve some ownership rights.

In step 411, devices in direct or other local communication are determined, e.g., using local communications modules 104 on those UE 101. For purposes of illustration it is assumed that UE 101*a* inclusive through UE 101*m* exclusive are in local communication with UE 101*m* of User M and their device IDs are determined during step 411. However, the device IDs of these UE 101 are not the same as the user IDs at the service 110 for the users of these devices. Therefore, the next steps determine the user IDs of the users of these UE 101 in direct or other local communication.

In step 413, the user ID of the local user for service 110 is broadcast to the other UE 101 in direct or other local communication, e.g., through the local communications module 104 on UE 101*m*. For example, the URI of service 110 and the user ID "Myself789" are periodically broadcast to the UE 101 in direct or other local communication, e.g., once every five minutes. Similarly, each of these UE 101 also broadcast the services and service user IDs for the services to which their users subscribe. During step 415, the user IDs at the services for users of the UE in direct or other local communication are received. For example, data is received at owner rights client 152 on UE 101*m* that indicates "Alice123" at service 110 for the user of UE 101*a*. Similarly, such data is received from each of the other UE 101 in direct or other local communication, such as "Bob456" at service 110 for the user of UE 101*b*. User IDs at other services, different from service 110, if any, are also received; and, in some embodiments ignored if User M is not a subscriber to such different services. For purposes of illustration, it is assumed the users of the UE 101 are all subscribers to service 110 and all their user IDs are received during step 415. In some embodiments, step 415 includes storing the information in local devices data structure 200 in a different device entry record 210 for each device in direct or other local communication.

In step 417, the local user's contacts are determined among all the user IDs received. The user IDs received during step 415 are compared to the list of the local user's contacts received during step 401. For example, User C of UE 101*c* has user ID "Charles007" as learned during step 415; but while "Alice123" and "Bob456" are in the contacts list for "Myself789", "Charles007" is not. Therefore, during step 417 it is determined that User M's service 110 contacts in direct or other local communication include "Alice123" and "Bob456" but not "Charles007."

In step 419, the selected subscribers for the service 110 are determined from the contacts in local communication. In some embodiments, step 419 includes all contacts in local communication as the selected subscribers to be granted ownership rights. In some embodiments, during step 419 all contacts in local communication are presented to the local user who is prompted to indicate which to include as the selected subscribers to be granted ownership rights. Thus in the illustrated embodiment, determining the first user identifier and the second user identifier further comprises determining that a first device associated with the first user identifier and a second device associated with the second user identifier are in direct radio communication. For example, upon selecting one of the contact groups listed in contact groups listing area 726, a group membership user interface (UI) is presented to the user as shown in FIG. 7C.

Figure 7C:
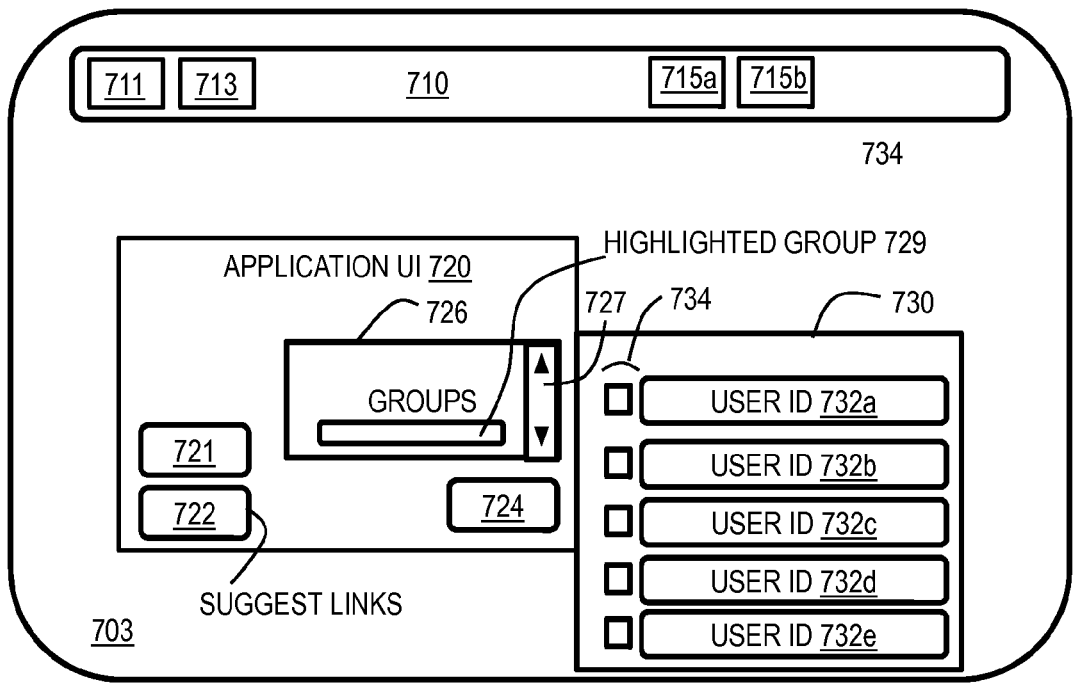

FIG. 7C is a diagram that illustrates an example screen 703 presented at UE 101 to present the user contacts after selecting a group in the contact groups listing area 726. Screen 703 includes the device toolbar 710 portion, application UI 720, buttons 721, 722, 724, and contact groups listing area 726, as described above. In screen 703, the group selected by the user is highlighted as highlighted group 729 in the contact groups listing area 726. The members of the highlighted group are presented in a group membership area 730. The group membership area 730 presents all the user IDs of the subscribers who are contacts of the local user at service 110 and members of the group, e.g., in user ID area 732*a* through user ID area 732*e*, among others, collectively referenced hereinafter as user ID areas 732. In some embodiments with larger memberships than can be presented in the area 730, a scrollbar is included in area 730 to allow a user to move into area 730 other user ID areas 732 that are out of area 730. A checkbox 734 is adjacent to each user ID area 732 to indicate whether the corresponding user ID is to be included among the selected subscribers to be granted ownership rights. In some embodiments, when area 730 is first presented, each checkbox 734 is checked; and, the user activates a check box to de-select a subscriber with the user ID presented in the corresponding user ID area 732. In some embodiments additional active areas are included, such as a button to check all or a button to toggle the check boxes or a button to accept the selections and close area 730, or some combination.

Returning to FIG. 4, in step 421, content to be sent to the service 110 for posting is determined. For example, in response to the local user activating the ENTER CONTENT button 721, the local user takes a picture with a camera option on a mobile terminal, such as a cell phone. In some embodiments, step 421 includes one or more messages exchanged between the local user and one or more other selected subscribers describing the content and service to which it will be posted. For example, User M shares content (e.g., an image of User A and User M at a bar) with User A and User B, e.g., in a separate channel from service 110, such as in one or more email or short message service (SMS) messages, and suggests that the content be posted to service 110 on User M's page associated with user ID "Myself789." Based on their responses, the local user determines to send the content to be posted at the service 110. Thus step 421 includes determining to send the first data (content) in association with the first user identifier (Myself789) to the service for presentation of the first data in association with the first user identifier.

In step 423, it is determined to grant ownership rights to the selected subscribers. Any method may be used to do this. In some embodiments, the granting of ownership rights is based on a shared secret, e.g., a value in the owner's secret field 266. In some embodiments, the granting of ownership rights is based on including a list of user IDs for subscribers with ownership rights in association with the posted content on the service, e.g., in owner rights user ID fields 268. Both embodiments are illustrated as steps 431 though 439 included in step 423. Thus step 423 includes determining to grant an ownership right for the first data at the service to both users identified by the first user identifier and the second user identifier.

Step 431 represents a decision point about which method is used for granting rights. If granting ownership rights is not based on a shared secret value, but on the list of selected subscribers in fields 268, then step 433 is performed. Otherwise steps 435, 437 and 439 are performed. In some embodiments using the shared secret, steps 431 and 433 are omitted. In some embodiments using the list of selected subscribers, steps 431, 435, 437 and 439 are omitted.

If granting of ownership rights is based on a list of selected subscribers, then in step 433, the content to post on the service is sent to the service in association with the user IDs of the selected subscribers. For example, during step 433, the image of User M and User A at the bar is sent to service 110 in a message that includes the user IDs "Alice123" and "Bob456" as well as the User ID of the subscriber making the post, "Myself789." Thus, in step 433, determining to grant an ownership right for the first data further comprises determining to send data that indicates an ownership right for the first data and the second user identifier to the service. In some embodiments, step 433 includes sending notifications to the selected subscribers. In some embodiments the notifications are sent by the service 110. In some embodiments, determining to send the first data (content) to the service during step 433, further comprises determining to send credentials that authenticate the first user identifier at the service.

If granting ownership rights is based on a shared secret value, then in step 435 the content to post on the service is sent to the service with only the user ID of the subscriber making the post "Myself789." In some embodiments, determining to send the first data (content) to the service during step 435, further comprises determining to send credentials that authenticate the first user identifier at the service. In step 437 a value of the owner's secret that indicates the one or more ownership rights is received from the service. Thus step 437 includes receiving data (owner's secret) that indicates an ownership right for the first data from the service. In step 439, the secret is distributed to the selected subscribers, e.g., to "Alice123" at UE 101a and to "Bob456" at UE 101b. Thus steps 439 includes determining to send data (owner's secret) that indicates the ownership right for the first data to a device associated with the second user identifier.

The next steps 441, 443 and 445 of process 400 are directed to receiving and exercising ownership rights in content posted by a different user, e.g., User M receiving ownership rights in content posted at service 110 by "Alice123."

In step 441, it is determined whether the local user has received ownership rights for a different post by another subscriber. In some embodiments, this is a notification message that includes the service ID, the item ID and the shared secret sent by the other user who posted the content, e.g., in an SMS message received by User M from User A. In some embodiments, this is a notification message that includes just the service ID and the item ID (the shared secret is not used) sent by the other user who posted the content, e.g., in an SMS message received by User M from User A. In some embodiments, the notification is presented in a user interface as described below with reference to FIG. 7D. Thus, step 441 includes receiving data that indicates an ownership right in second data (different post) presented at the service in association with a third user identifier (other user). In some embodiments, the third user who made the other post is the same as the second user who receives ownership rights for the first post.

If no notification is received, then, in step 451, it is determined whether there is further content to post by the local user. If so, control passes back to step 403 to determine the selected subscribers for ownership rights in the next posting, as described above. If there is not another posting at the current time, then it is determined if end conditions are satisfied, e.g., the client 117 or connection to service 110 is closed. If so, the process ends, otherwise control passes back to step 441 to determine if ownership rights are received in yet another posting by another subscriber, as described above.

Figure 7D:
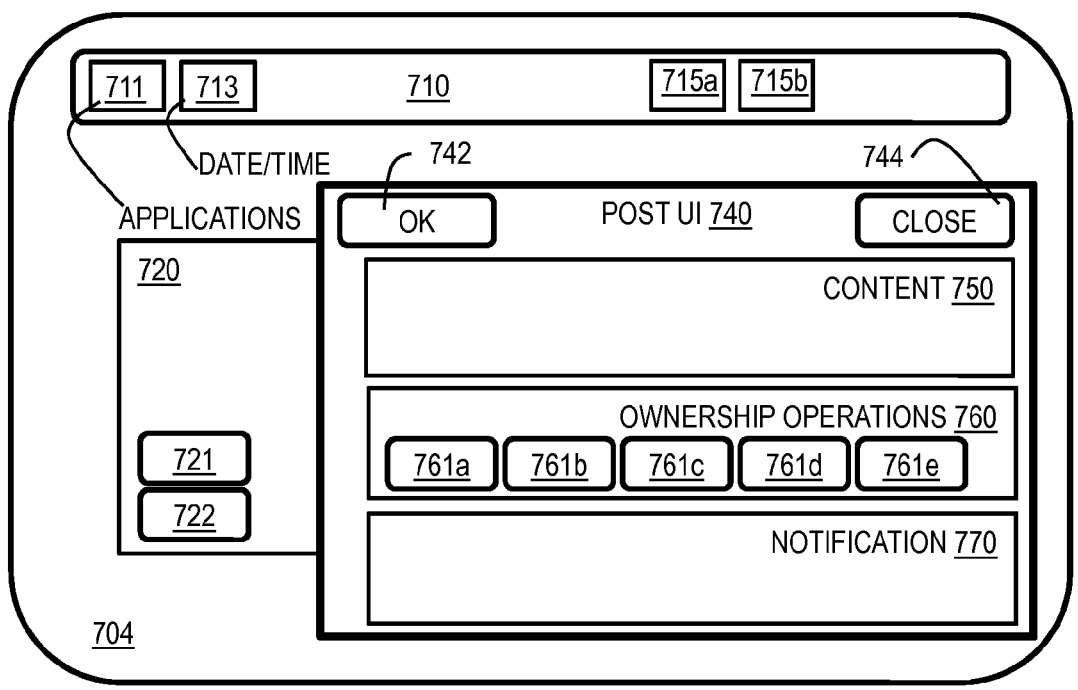

In some embodiments, the notification determined to be received during step 441 is presented as a user interface as shown in FIG. 7D. FIG. 7D is a diagram that illustrates an example screen 704 presented at UE 101 to present notification of ownership rights granted or exercised or both for a posting by another subscriber. Screen 704 includes the device toolbar 710 portion, application UI 720, and buttons 721, 722, as described above. In screen 704, the post user interface (UI) area 740 is presented. The post UI area 740 includes an OK button 742, a CLOSE button 744,a content area 750, an ownership operations area 760 and a notification area 770. Upon activation of the CLOSE button 744 the post UI area 740 is closed without exercising any ownership rights. Upon activation of the OK button 742 one or more selected ownership operations on the content of the post are executed, and the post UI area 740 remains open.

The content area 750 presents the content that has been posted or is about to be posted by another subscriber, such as the image of User M and User A at the bar.

The ownership operations area 760 includes one or more buttons 761a, 761b, 761c, 761 d, 761d (collectively referenced hereinafter as ownership operation buttons 761) that are activated to select one or more ownership operations. For example, in some embodiments, button 761a is activated to vote for another subscriber to post the content in area 750 that is not yet posted and button 761b is activated to vote against. These buttons are deactivated, e.g., by graying out, if the content has already been posted. In some embodiments, button 761c is activated to copy the content to the service area of the local user at service 110 (e.g., home page at a social network service). In some embodiments, button 761d is activated to remove any tags or links to the local user from the content posted at the service area of the other subscribers. In some embodiments, button 761e is activated to remove all instances of the content on the service areas of all members of the group of selected subscribers. Operations that do not apply, or that involve rights not granted, are indicated by omitting or deactivating the corresponding buttons.

The notification area 770 presents data that indicates actions taken by other subscribers with ownership rights. For example, notification area 750 presents data that indicates "Alice123" has granted ownership rights to the local user; or that "Bob456" has removed the content in area 750 from his service area at service 110.

If it is determined in step 441 that the local user has received ownership rights for a different post by another subscriber, e.g., if post UI area 740 is presented, then control passes to step 443. In step 443, it is determined whether to exercise the ownership right, e.g., to remove content posted by another. For example, it is determined in step 443 if one of the ownership operation buttons 761 and OK button 742 have been activated. If so, then in step 445 a message is sent to the service to exercise the ownership right over the other post. Thus, step 445 includes determining to send data that indicates exercise of the ownership right in the second data (different post) to the service. For example, exercise owner rights message 300 is sent from owner rights client module 152 on UE 101*m* to owner rights service module 150 in service 110. The message 300 indicates the user credentials in field 302, the item ID indicated in field 304 and the operation in field 308. In embodiments that rely on a shared secret, the value of the secret is included in field 306. In response to the message, the service 110 authenticates the message based on the user credentials in field 302 (and the secret in field 306, if present); and, if authenticated, operates on the content having item ID indicated in field 304 as indicated by data in the operation field 308, as described in more detail below with reference to FIG. 5.

Control passes back to step 443 from step 445 to perform any further operations allowed by the ownership rights, if desired. If no more such rights are to be exercised, e.g., if the CLOSE button 744 is activated, then control passes to step 451 and following, as described above.

Figure 8:
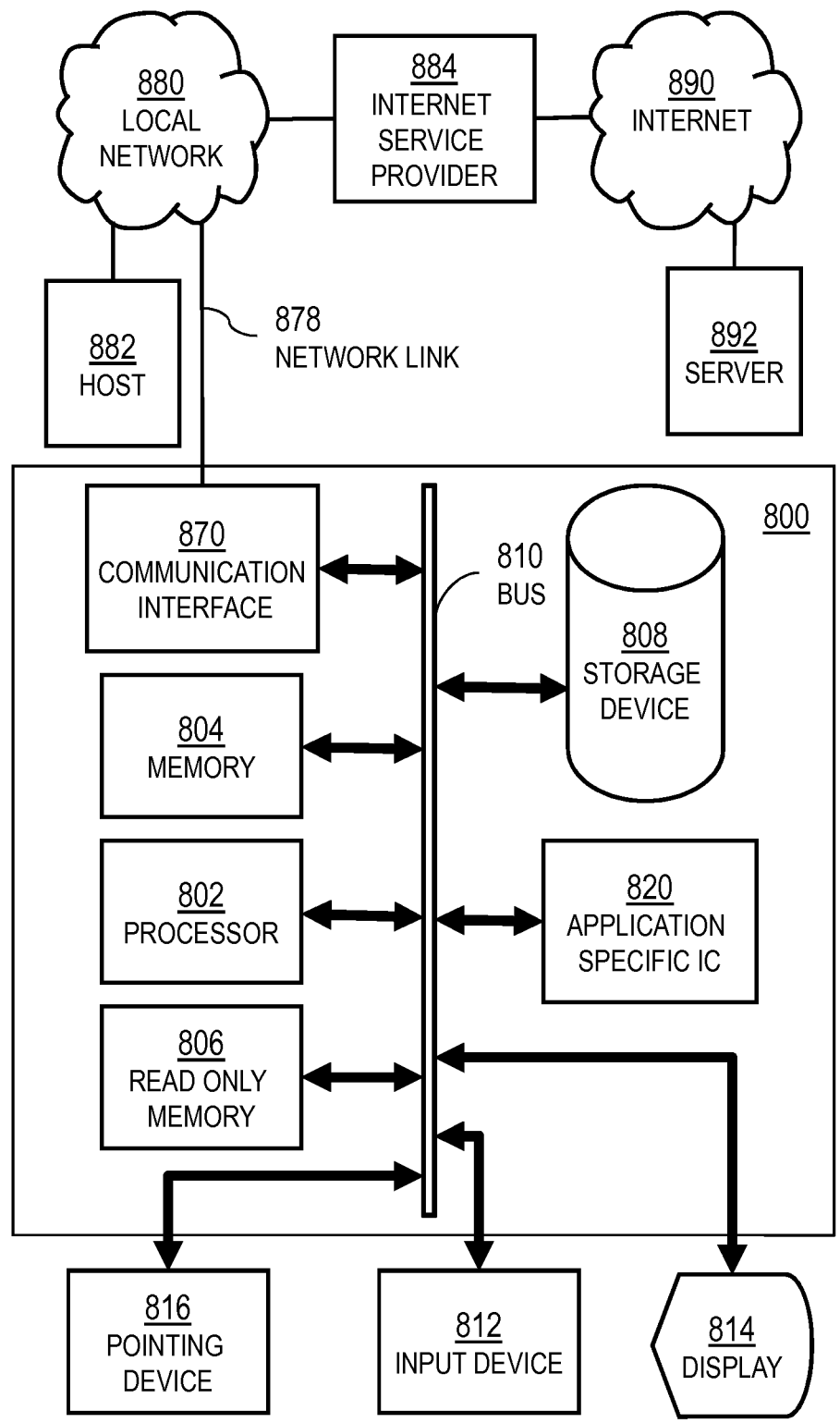
FIG. 8 is a diagram of hardware that can be used to implement an embodiment of the invention.

FIG. 5 is a flowchart of a process 500 at a service for granting ownership rights, according to one embodiment. In one embodiment, the service 110 and owner rights service module 150 performs the process 500 and are implemented in, for instance, a chip set including a processor and a memory as shown in FIG. 9, or computer system as depicted in FIG. 8.

In step 501, the subscriber profile including contacts of a first user are sent in response to a request from a device of that user, e.g., in response to a request message from client 117*m* on UE 101*m*. In some embodiments, step 501 includes causing a prompt to presented for user input of credentials, such as user ID and password, and authenticating the first user based on the response to the prompt. Step 501 represents a service side response to step 401 on the client side.

The remainder of the processing depends on whether ownership rights are granted based on a shared secret or on a list of user IDs for subscribers with ownership rights. Step 503 represents a decision point about which method is used for granting rights. If granting ownership rights is not based on a shared secret value, but on the list of selected subscribers in fields 268, then steps 511 to 533 are performed. Otherwise steps 541 to 563 are performed. In some embodiments using the shared secret, steps 503 to 533 are omitted. In some embodiments using the list of selected subscribers, steps 503 and 541 to 563 are omitted.

If granting of ownership rights is based on a list of selected subscribers, then, in step 511, content to be posted is received from the device of the first user of the service (e.g., the first subscriber). For example, in one embodiment, User M is the first subscriber and the content received during step 511 is the image of User M and User A at the bar. Thus step 511 includes receiving a first user identifier (first subscriber) associated with first data (content). Also received during step 511 is a list of the user IDs of the selected subscribers who have ownership rights in the content. For example, data indicating "Alice123" and "Bob456" is also received in association with the image of User M and User A at the bar. In some embodiments, step 511 includes assigning the content an item ID value for field 262 and recording the information in post entry record 260 of the user post data structure 250. The user ID of the sending subscriber is stored in field 264 and the other user IDs are stored in corresponding fields 268. Thus step 511 includes receiving data that indicates a different second user identifier and exercise of an ownership right for the first data. Receiving the first user identifier associated with the first data (content) further comprises receiving the second user identifier associated with the first data (content).

In step 513, the content is posted at the service. In some embodiments, the content is only posted at the service area of the first subscriber who sent the content. Thus, step 513 includes determining to present the first data (content) in association with the first user identifier (first subscriber). In some embodiments, the content is posted at the service areas of the first subscriber and one or more or all of the other selected subscribers with ownership rights. Thus step 513 includes determining to present the first data (content) in association with the second user identifier if the second user has the ownership right for the first data by virtue of being listed.

In step 515 a link or tag indicating other selected subscribers or first subscriber with ownership rights are included in association with each subscriber's service area that posts the content. In some embodiments, step 515 is omitted.

In step 517, notification is sent to the selected subscribers. The notification indicates that the content has been posted, where the content has been posted (e.g., which service areas), and any links or tags that are associated at each post. For example, data for post UI area 740 is sent with the notification in area 770, in some embodiments. In some embodiments, the notification in area 770 is sent outside the service 110, e.g., in an SMS or email message.

In step 521, it is determined if a message is received from a different second subscriber to exercise an ownership right over the posted content, e.g., it is determined whether an exercise owner rights message 300 is received that indicates the item ID in field 304 of the content posted by the first subscriber. If not, control passes to step 531 to determine if another post is being received. If so, control passes back to step 511, described above. If not, then, in step 533, it is determine if end conditions are satisfied, e.g., whether the service is shutting down. If end conditions are satisfied, then the process 500 ends; otherwise, control passes back to step 521 to determine if a message to exercise an ownership right is received.

If a message is received to exercise an ownership right, then in step 523, the sender of the message is authenticated, e.g., based on the user credentials in field 302 of the message 300. In step 525, it is determined if the sender passes authentication. If not, control skips to step 531 and following as described above. Thus step 523 includes determining whether the second user has the ownership right for the first data by authenticating the second user identifier.

If the sender passes authentication, then in step 527 the ownership operation is performed on the post. For example, the content is copied, a tag or link or comment is added or removed, or the content is removed from one or more or all service areas (in some embodiments of the latter case, the corresponding post entry field 260 is deleted from the data structure 250). In step 529, a notification is sent to the other subscribers that the ownership right has been exercised by the subscriber who sent the message. For example, data for post UI area 740 is sent with the notification in area 770, in some embodiments. In some embodiments, the notification in area 770 is sent outside the service 110, e.g., in an SMS or email message. Control then passes to step 531 and following, described above.

If granting of ownership rights is based on a shared secret, then, in step 541, content to be posted is received from the device of the first user of the service (e.g., the first subscriber) as in step 511. For example, in one embodiment, User M is the first subscriber and the content received during step 541 is the image of User M and User A at the bar. Unlike step 511, no data indicating a list of selected subscribers is received. In some embodiments, step 541 includes assigning the content an item ID value for field 262 and generating a secret value for field 266 and recording the information in post entry record 260 of the user post data structure 250. The user ID of the sending subscriber is stored in field 264. In some embodiments the secret for field 266 is provided by the first subscriber.

In step 543 it is determined to send a secret to the first subscriber. For example, the generated secret stored in field 266 of a post entry generated for the post is retrieved and sent to the first subscriber. Thus, step 543 includes determining to send second data (owner's secret) that indicates the ownership right to a device associated with the first user identifier (first subscriber). In some embodiments, the secret is provided by the first subscriber; and step 543 is omitted.

In step 545, the content is posted at the service. In some embodiments, the content is only posted at the service area of the first subscriber who sent the content. The content is not posted at the service areas of any of the other selected subscribers with ownership rights, because at step 545 such other subscribers are not yet specified to the service and are thus unknown by process 500. Such other subscribers can only post the content by presenting the secret value for authentication in step 553 and exercising the ownership right to copy the content in step 557, described below.

Steps 551, 553, 555, 557, 559, 561 and 563 parallel steps 521, 523, 525, 527, 529, 531 and 533 described above, respectively. A difference is that authentication during step 553 is also based, at least in part, on a secret value. Another difference, in some embodiments, is that an authenticated subscriber is added as an owner of the content during step 557, e.g., a field 268 indicating the user ID of the authenticated subscriber is added to the post entry field 260.

In step 551, it is determined if a message is received from a different second subscriber to exercise an ownership right over the posted content, e.g., it is determined whether an exercise owner rights message 300 is received that indicates the item ID in field 304 of the content posted by the first subscriber and the owner's secret. Thus, step 551 includes receiving data that indicates a different second user identifier and the owner's secret which is an indication of exercise of an ownership right for the first data. If not, control passes to step 561 to determine if another post is being received. If another post is being received, control passes back to step 541, described above. If not, then, in step 563, it is determined if end conditions are satisfied, e.g., whether the service is shutting down. If end conditions are satisfied, then the process 500 ends; otherwise, control passes back to step 551 to determine if a message to exercise an ownership right is received.

If a message is received to exercise an ownership right, then in step 553, the sender of the message is authenticated, e.g., based on the user credentials in field 302 and secret value in field 306 of the message 300. Thus step 553 includes determining whether the second user has the ownership right for the first data. That is, determining whether the second user has the ownership right for the first data (content) further comprises determining whether the data that indicates the second user identifier and exercise of the ownership right further indicates the second data (owner's secret). In step 555, it is determined if the sender passes authentication. If not, control skips to step 561 and following as described above.

If the sender and secret passes authentication, then in step 557 the ownership operation is performed on the post. Thus step 557 includes determining to operate on the first data (content) based on the ownership right if the second user (sending subscriber) has the ownership right for the first data by virtue of the owner's secret. In some embodiments, step 557 includes adding the authenticated sender as an owner of the content, e.g., by adding the user ID of the authenticated sender to a field 268 of the post entry record 260. For example, the content is copied, a tag or comment or link is added or removed, or the content is removed from one or more or all service areas (in some embodiments of the latter case, the corresponding post entry field 260 is deleted from the data structure 250). When the content is copied, step 557 amounts to determining to present the first data (content) in association with the second user identifier if the second user has the ownership right for the first data by virtue of bearing the owner's secret. In step 559, a notification is sent to the other subscribers that the ownership right has been exercised by the subscriber who sent the message. For example, data for post UI area 740 is sent with the notification in area 770, in some embodiments. In some embodiments, the notification in area 770 is sent outside the service 110, e.g., in an SMS or email message. Control then passes to step 561 and following, described above.

FIGS. 6A-6C are time sequence diagrams of messages to grant and exercise ownership rights in content posted at a service, according to various embodiments. In time sequence diagrams, time increases downward (not to scale), an individual network process is represented by vertically elongated boxes labeled by rectangles at the top. A message sent from one process to another is indicated by a horizontal arrow pointing from the sending process to the receiving process. A step at a single process is indicated by a segmented arrow looping back on the process at a vertical position indicative of the relative time when the step occurs. The processes represented in FIG. 6A-6C include clients 117a through 117m (represented by the first and last clients of the set of M users), including corresponding owner rights client modules 152, and service 110, including owner rights service module 150 and user specific service areas 601a through 601m (represented by the first and last user home pages of a social network service).

FIG. 6A depicts time sequence 600 for ownership rights based on a list of selected subscribers, according to an embodiment. In one or more messages 611 between owner rights client modules 152 in clients 117a and 117m, during step 421, User M and User A agree to post content on both their walls, e.g., an image of User A and User M at a bar. In some embodiments, User A and User M are together and know each other's user IDs at service 110. In some embodiments, the user IDs of all users in local communication are determined and the post is shared with all; but User M only grants ownership rights to User A during step 423 by de-selecting the check boxes of the other users in dynamic group area 730 for contacts in local communication.

In one or more messages 613, during step 433, the content is sent to the owner rights service module 150 in service 110 along with the user IDs of both subscribers to service 110, e.g., from owner rights client module 152 in client 117m with data indicating "Myself789" and "Alice123." The content and subscriber IDs are received at module 150 during step 511.

During step 513 and step 515, the content is posted to the User A home page with links to User M in one or more messages 615a; the same content is posted to the User M home page with links to User A in one or more messages 615b. During step 517, notification of the posting with a link to "Myself789" is sent to the user rights client module 152 in client 117a in one or more messages 621a; and presented to User A, e.g., in post UI area 740. This amounts to receiving notice of ownership rights by User A from User M during step 441. Similarly, during step 517, notification of the posting with a link to "Alice123" is sent to the user rights client module 152 in client 117m in one or more messages 621b; and presented to User M, e.g., in post UI area 740.

At some later time, User A feels regret about the posting, and during step 443 determines to exercise the ownership right to remove the link to her page from the posting on the home page of User M, e.g., by activating a corresponding button 761 and the OK button 742 in post UI area 740. One or more delete post messages 623 is sent. For example, an exercise owner rights message 300 is sent with data in field 308 indicating to delete her own post and links from other posts. In message 623, the user credentials field 302 indicates "Alice123", the item ID field indicates the item ID 1234567 for the image of User A and User M in the bar, and the secret field 306 is omitted. This message is received at the owner rights service module 150 during step 521.

In process 625, e.g., during step 523, user A is authenticated. If user A is authenticated, the posting is removed from User A's home page in one or more messages 627a; and the link to "Alice123" is removed from field 272 of the post entry, e.g., during step 527.

In one or more messages 629 sent during step 529, notification of the removal by User A is sent to the owner rights client module 152 in client 117m of User M for display in area 770 of post UI area 740.

If User M decides to leave the content as a post on the User M home page, no further action is taken. However, if, based on the notification received, User M determines to exercise the ownership right to delete the posting from his page, e.g., by activating the corresponding button 761 on post UI area 740 during step 443, then, during step 445 one or more messages 631 are sent to delete the posting. For example an exercise owner rights message 300 is sent that indicates "Myself789" in field 302 along with any token or password used as authentication credentials, indicates the item ID 1234567 of the image of User M and User A at the bar in field 304 and indicates delete post in field 308. In this embodiment, the secret field 306 is not used; and is omitted.

In process 635, e.g., during step 523, user M is authenticated. If user M is authenticated, the posting is removed from User M's home page in one or more messages 637.

In one or more messages 639 sent during step 529, notification of the removal by User M is sent to the owner rights client module 152 in client 117a of User A for display in area 770 of post UI area 740.

In another example embodiment, User A feels regret about the posting, and during step 443 instead of determining to exercise the ownership right to remove the link to her from the posting on the home page of User M, User A determines to remove the content from all service areas, e.g., by activating a different button 761 and the OK button 742 in post UI area 740.

In process 625, e.g., during step 523, user A is authenticated. In this embodiment, if user A is authenticated, the posting is removed not only from User A's home page in one or more messages 627a; but is also removed from User M's home page in one or more messages 637. In some of these embodiments, the post entry field 260 that includes the image of User M and User A at the bar is deleted from the user posts data structure 250.

In one or more messages 629 sent during step 529, notification of the removal by User A is sent to the owner rights client module 152 in client 117m of User M for display in area 770 of post UI area 740.

FIG. 6B depicts time sequence 640 for ownership rights based on a secret value, according to an embodiment. In one or more messages 641 during step 435, the owner rights client module 152 in client 117m of User M sends to the owner rights service module 150 content to be posted on User M's home page.

During step 541 the content is received. During step 543 a secret is generated and sent to the owner rights client module 152 in one or more secret messages 645. During step 545 the content is posted to the home page of User M in one or more messages 643 and a post entry field 260 is added to the user posts data structure 250, with an item ID value 1234567 in field 262, data indicating "Myself789" in field 264, the secret in field 266 and the content in field 270. No fields 268 are included.

During step 437, the secret is received; and during step 439 the secret is distributed to selected subscribers in one or more messages 647a to owner rights client module 152 on client 117a and one or more messages 647b to owner rights client module 152 on client 117b, among others indicated by ellipsis, collectively referenced hereinafter as secret messages 647. The secret messages 647 indicate the item ID value 1234567 and the secret value. In some embodiments, the secret messages 647 also indicate the sender, "Myself789."

It is assumed for purposes of illustration that the selected subscribers include all those in local communication with UE 101m of User M; but, only User A and User B choose to exercise their ownership rights to add or delete the content. The other selected subscribers do nothing.

When the secret messages 647 are received at each owner rights client module 152, it is determined during step 441 that ownership rights have been received for content posted by "Myself789," e.g., post UI area 740 is presented with the image of User A and User M at the bar, and with notification area 770 indicating ownership rights to copy or delete the content.

User A decides to add the content to her home page and indicates so by activating the corresponding button 761 and OK button 742 of the post UI area 740. In step 443, it is determined that the ownership right to copy the post has been chosen, and during step 445 one or more messages 651 are sent to the owner rights service module 150. For example, message 300 includes a user credentials field 302 that indicates "Alice123" and any password or token, the item ID field indicates the item ID value 1234567 for the image of User A and User M in the bar, the secret field 306 indicates the distributed secret, and the operation field 308 indicates copy the content to a post on the sender's home page. This message is received at the owner rights service module 150 during step 551.

In process 653, e.g., during step 553, user A is authenticated based at least in part on the secret value. If user A is authenticated, then during step 557 the posting is added to User A's home page in one or more messages 655. The post entry field 360 is modified with a link to User A in field 272 and a field 268 added that holds data that indicates the user ID "Alice123." In one or more messages sent during step 559, notification of the copying by "Alcie123" is sent to the owner rights client module 152 in client 117*m* of User M for display in area 770 of post UI area 740.

User B decides to remove the content pages of the service; and indicates so by activating the corresponding button 761 and OK button 742 of the post UI area 740. In step 443, it is determined that the ownership right to remove the content has been chosen, and during step 445 one or more messages 661 are sent to the owner rights service module 150. For example, message 300 includes a user credentials field 302 that indicates "Bob456" and any password or token used for authentication, the item ID field indicates the item ID value 1234567 for the image of User A and User M in the bar, the secret field 306 indicates the distributed secret, and the operation field 308 indicates removal of the content from all posts. This message is received at the owner rights service module 150 during step 551.

In process 663, e.g., during step 553, user B is authenticated based at least in part on the secret value. If user B is authenticated, then during step 557 the content is removed from the posts on User M's home page and User A's home page in one or more messages 665*a* and one or more messages 665*b*, respectively. In some embodiments, the post entry field 260 is deleted from the user posts data structure 250. In one or more messages 657*a* and one or more messages 657*b* sent during step 559, notification of the removal of the content by "Bob456" is sent to the owner rights client module 152 in client 117*a* of User A and in client 117*m* of User M, respectively, for display in area 770 of post UI area 740 on each.

FIG. 6C depicts time sequence 660 for ownership rights based on a secret value, according to another embodiment that involves communications among selected subscribers before initial posting. During step 421, User M sends content for a suggested posting from the owner rights client module 152 on client 117*m* to all the selected subscribers in one or more post question messages 651*a* to owner rights client module 152 in client 117*a*, one or more post question messages 651*b* to owner rights client module 152 in client 117*b*, and one or more post question messages indicated by ellipsis to other selected subscribers (collectively referenced hereinafter as post question messages 651). At each client module 152 the suggested post is presented, e.g., in a post UI area 740.

In response, also during step 421, zero or more vote messages are received, e.g., in response to user activation of a corresponding button 761 and the OK button 742. For example, owner rights client module 152 on client 117*m* receives one or more vote messages 653*a* from the owner rights client module 152 on client 117*a*, one or more vote messages 653*ba* from the owner rights client module 152 on client 117*b*, one or more vote messages from the owner rights client module 152 on other clients indicated by ellipsis (collectively referenced hereinafter as vote messages 653).

Based on the response, still during step 421, it is determined whether to post the content. For example, in some embodiments, the content is not posted until all the votes are in and a unanimous vote to post is received. In some embodiments, a majority of all possible votes is enough. In some embodiments, a majority of responding votes is enough. In some embodiments a majority of a quorum of votes is enough. If it is determined to post the content, the posting is done. The remaining messages 541 through 657*b* and processes 653 and 663 are as described above for FIG. 6B.

The processes described herein for granting ownership rights for content posted at a service may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

FIG. 8 illustrates a computer system 800 upon which an embodiment of the invention may be implemented. Although computer system 800 is depicted with respect to a particular device or equipment, it is contemplated that other devices or equipment (e.g., network elements, servers, etc.) within FIG. 8 can deploy the illustrated hardware and components of system 800. Computer system 800 is programmed (e.g., via computer program code or instructions) to grant ownership rights for content posted at a service as described herein and includes a communication mechanism such as a bus 810 for passing information between other internal and external components of the computer system 800. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 800, or a portion thereof, constitutes a means for performing one or more steps of granting ownership rights for content posted at a service.

A bus 810 includes one or more parallel conductors of information so that information is transferred quickly among devices coupled to the bus 810. One or more processors 802 for processing information are coupled with the bus 810.

A processor (or multiple processors) 802 performs a set of operations on information as specified by computer program code related to granting ownership rights for content posted at a service. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 810 and placing information on the bus 810. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 802, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 800 also includes a memory 804 coupled to bus 810. The memory 804, such as a random access memory (RAM) or any other dynamic storage device, stores information including processor instructions for granting ownership rights for content posted at a service. Dynamic memory allows information stored therein to be changed by the computer system 800. RAM allows a unit of information stored at a location called a memory address to be stored and retrieved independently of information at neighboring addresses. The memory 804 is also used by the processor 802 to store temporary values during execution of processor instructions. The computer system 800 also includes a read only memory (ROM) 806 or any other static storage device coupled to the bus 810 for storing static information, including instructions, that is not changed by the computer system 800. Some memory is composed of volatile storage that loses the information stored thereon when power is lost. Also coupled to bus 810 is a non-volatile (persistent) storage device 808, such as a magnetic disk, optical disk or flash card, for storing information, including instructions, that persists even when the computer system 800 is turned off or otherwise loses power.

Information, including instructions for granting ownership rights for content posted at a service, is provided to the bus 810 for use by the processor from an external input device 812, such as a keyboard containing alphanumeric keys operated by a human user, or a sensor. A sensor detects conditions in its vicinity and transforms those detections into physical expression compatible with the measurable phenomenon used to represent information in computer system 800. Other external devices coupled to bus 810, used primarily for interacting with humans, include a display device 814, such as a cathode ray tube (CRT), a liquid crystal display (LCD), a light emitting diode (LED) display, an organic LED (OLED) display, a plasma screen, or a printer for presenting text or images, and a pointing device 816, such as a mouse, a trackball, cursor direction keys, or a motion sensor, for controlling a position of a small cursor image presented on the display 814 and issuing commands associated with graphical elements presented on the display 814. In some embodiments, for example, in embodiments in which the computer system 800 performs all functions automatically without human input, one or more of external input device 812, display device 814 and pointing device 816 is omitted.

In the illustrated embodiment, special purpose hardware, such as an application specific integrated circuit (ASIC) 820, is coupled to bus 810. The special purpose hardware is configured to perform operations not performed by processor 802 quickly enough for special purposes. Examples of ASICs include graphics accelerator cards for generating images for display 814, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 800 also includes one or more instances of a communications interface 870 coupled to bus 810. Communication interface 870 provides a one-way or two-way communication coupling to a variety of external devices that operate with their own processors, such as printers, scanners and external disks. In general the coupling is with a network link 878 that is connected to a local network 880 to which a variety of external devices with their own processors are connected. For example, communication interface 870 may be a parallel port or a serial port or a universal serial bus (USB) port on a personal computer. In some embodiments, communications interface 870 is an integrated services digital network (ISDN) card or a digital subscriber line (DSL) card or a telephone modem that provides an information communication connection to a corresponding type of telephone line. In some embodiments, a communication interface 870 is a cable modem that converts signals on bus 810 into signals for a communication connection over a coaxial cable or into optical signals for a communication connection over a fiber optic cable. As another example, communications interface 870 may be a local area network (LAN) card to provide a data communication connection to a compatible LAN, such as Ethernet. Wireless links may also be implemented. For wireless links, the communications interface 870 sends or receives or both sends and receives electrical, acoustic or electromagnetic signals, including infrared and optical signals, that carry information streams, such as digital data. For example, in wireless handheld devices, such as mobile telephones like cell phones, the communications interface 870 includes a radio band electromagnetic transmitter and receiver called a radio transceiver. In certain embodiments, the communications interface 870 enables connection to the communication network 105 for granting ownership rights for content posted at a service from the UE 101.

The term "computer-readable medium" as used herein refers to any medium that participates in providing information to processor 802, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 808. Volatile media include, for example, dynamic memory 804. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 820.

Network link 878 typically provides information communication using transmission media through one or more networks to other devices that use or process the information. For example, network link 878 may provide a connection through local network 880 to a host computer 882 or to equipment 884 operated by an Internet Service Provider (ISP). ISP equipment 884 in turn provides data communication services through the public, world-wide packet-switching communication network of networks now commonly referred to as the Internet 890.

A computer called a server host 892 connected to the Internet hosts a process that provides a service in response to information received over the Internet. For example, server host 892 hosts a process that provides information representing video data for presentation at display 814. It is contemplated that the components of system 800 can be deployed in various configurations within other computer systems, e.g., host 882 and server 892.

At least some embodiments of the invention are related to the use of computer system 800 for implementing some or all of the techniques described herein. According to one embodiment of the invention, those techniques are performed by computer system 800 in response to processor 802 executing one or more sequences of one or more processor instructions contained in memory 804. Such instructions, also called computer instructions, software and program code, may be read into memory 804 from another computer-readable medium such as storage device 808 or network link 878. Execution of the sequences of instructions contained in memory 804 causes processor 802 to perform one or more of the method steps described herein. In alternative embodiments, hardware, such as ASIC 820, may be used in place of or in combination with software to implement the invention. Thus, embodiments of the invention are not limited to any specific combination of hardware and software, unless otherwise explicitly stated herein.

The signals transmitted over network link 878 and other networks through communications interface 870, carry information to and from computer system 800. Computer system 800 can send and receive information, including program code, through the networks 880, 890 among others, through network link 878 and communications interface 870. In an example using the Internet 890, a server host 892 transmits program code for a particular application, requested by a message sent from computer 800, through Internet 890, ISP equipment 884, local network 880 and communications interface 870. The received code may be executed by processor 802 as it is received, or may be stored in memory 804 or in storage device 808 or any other non-volatile storage for later execution, or both. In this manner, computer system 800 may obtain application program code in the form of signals on a carrier wave.

Various forms of computer readable media may be involved in carrying one or more sequence of instructions or data or both to processor 802 for execution. For example, instructions and data may initially be carried on a magnetic disk of a remote computer such as host 882. The remote computer loads the instructions and data into its dynamic memory and sends the instructions and data over a telephone line using a modem. A modem local to the computer system 800 receives the instructions and data on a telephone line and uses an infra-red transmitter to convert the instructions and data to a signal on an infra-red carrier wave serving as the network link 878. An infrared detector serving as communications interface 870 receives the instructions and data carried in the infrared signal and places information representing the instructions and data onto bus 810. Bus 810 carries the information to memory 804 from which processor 802 retrieves and executes the instructions using some of the data sent with the instructions. The instructions and data received in memory 804 may optionally be stored on storage device 808, either before or after execution by the processor 802.

FIG. 9 illustrates a chip set or chip 900 upon which an embodiment of the invention may be implemented. Chip set 900 is programmed to grant ownership rights for content posted at a service as described herein and includes, for instance, the processor and memory components described with respect to FIG. 8 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 900 can be implemented in a single chip. It is further contemplated that in certain embodiments the chip set or chip 900 can be implemented as a single "system on a chip." It is further contemplated that in certain embodiments a separate ASIC would not be used, for example, and that all relevant functions as disclosed herein would be performed by a processor or processors. Chip set or chip 900, or a portion thereof, constitutes a means for performing one or more steps of providing user interface navigation information associated with the availability of functions. Chip set or chip 900, or a portion thereof, constitutes a means for performing one or more steps of granting ownership rights for content posted at a service.

In one embodiment, the chip set or chip 900 includes a communication mechanism such as a bus 901 for passing information among the components of the chip set 900. A processor 903 has connectivity to the bus 901 to execute instructions and process information stored in, for example, a memory 905. The processor 903 may include one or more processing cores with each core configured to perform independently. A multi-core processor enables multiprocessing within a single physical package. Examples of a multi-core processor include two, four, eight, or greater numbers of processing cores. Alternatively or in addition, the processor 903 may include one or more microprocessors configured in tandem via the bus 901 to enable independent execution of instructions, pipelining, and multithreading. The processor 903 may also be accompanied with one or more specialized components to perform certain processing functions and tasks such as one or more digital signal processors (DSP) 907, or one or more application-specific integrated circuits (ASIC) 909. A DSP 907 typically is configured to process real-world signals (e.g., sound) in real time independently of the processor 903. Similarly, an ASIC 909 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 900 includes merely one or more processors and some software and/or firmware supporting and/or relating to and/or for the one or more processors.

The processor 903 and accompanying components have connectivity to the memory 905 via the bus 901. The memory 905 includes both dynamic memory (e.g., RAM, magnetic disk, writable optical disk, etc.) and static memory (e.g., ROM, CD-ROM, etc.) for storing executable instructions that when executed perform the inventive steps described herein to grant ownership rights for content posted at a service. The memory 905 also stores the data associated with or generated by the execution of the inventive steps.

FIG. 10 is a diagram of exemplary components of a mobile terminal (e.g., handset) for communications, which is capable of operating in the system of FIG. 1, according to one embodiment. In some embodiments, mobile terminal 1001, or a portion thereof, constitutes a means for performing one or more steps of granting ownership rights for content posted at a service. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a base-band integrated circuit or applications processor integrated circuit in a mobile phone or a similar integrated circuit in a cellular network device or other network devices.

Pertinent internal components of the telephone include a Main Control Unit (MCU) 1003, a Digital Signal Processor (DSP) 1005, and a receiver/transmitter unit including a microphone gain control unit and a speaker gain control unit. A main display unit 1007 provides a display to the user in support of various applications and mobile terminal functions that perform or support the steps of granting ownership rights for content posted at a service. The display 1007 includes display circuitry configured to display at least a portion of a user interface of the mobile terminal (e.g., mobile telephone). Additionally, the display 1007 and display circuitry are configured to facilitate user control of at least some functions of the mobile terminal. An audio function circuitry 1009 includes a microphone 1011 and microphone amplifier that amplifies the speech signal output from the microphone 1011. The amplified speech signal output from the microphone 1011 is fed to a coder/decoder (CODEC) 1013.

A radio section 1015 amplifies power and converts frequency in order to communicate with a base station, which is included in a mobile communication system, via antenna 1017. The power amplifier (PA) 1019 and the transmitter/modulation circuitry are operationally responsive to the MCU 1003, with an output from the PA 1019 coupled to the duplexer 1021 or circulator or antenna switch, as known in the art. The PA 1019 also couples to a battery interface and power control unit 1020.

In use, a user of mobile terminal 1001 speaks into the microphone 1011 and his or her voice along with any detected background noise is converted into an analog voltage. The analog voltage is then converted into a digital signal through the Analog to Digital Converter (ADC) 1023. The control unit 1003 routes the digital signal into the DSP 1005 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1025 for compensation of any frequency-dependent impairments that occur during transmission though the air such as phase and amplitude distortion. After equalizing the bit stream, the modulator 1027 combines the signal with a RF signal generated in the RF interface 1029. The modulator 1027 generates a sine wave by way of frequency or phase modulation. In order to prepare the signal for transmission, an up-converter 1031 combines the sine wave output from the modulator 1027 with another sine wave generated by a synthesizer 1033 to achieve the desired frequency of transmission. The signal is then sent through a PA 1019 to increase the signal to an appropriate power level. In practical systems, the PA 1019 acts as a variable gain amplifier whose gain is controlled by the DSP 1005 from information received from a network base station. The signal is then filtered within the duplexer 1021 and optionally sent to an antenna coupler 1035 to match impedances to provide maximum power transfer. Finally, the signal is transmitted via antenna 1017 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 1001 are received via antenna 1017 and immediately amplified by a low noise amplifier (LNA) 1037. A down-converter 1039 lowers the carrier frequency while the demodulator 1041 strips away the RF leaving only a digital bit stream. The signal then goes through the equalizer 1025 and is processed by the DSP 1005. A Digital to Analog Converter (DAC) 1043 converts the signal and the resulting output is transmitted to the user through the speaker 1045, all under control of a Main Control Unit (MCU) 1003 which can be implemented as a Central Processing Unit (CPU) (not shown).

The MCU 1003 receives various signals including input signals from the keyboard 1047. The keyboard 1047 and/or the MCU 1003 in combination with other user input components (e.g., the microphone 1011) comprise a user interface circuitry for managing user input. The MCU 1003 runs a user interface software to facilitate user control of at least some functions of the mobile terminal 1001 to grant ownership rights for content posted at a service. The MCU 1003 also delivers a display command and a switch command to the display 1007 and to the speech output switching controller, respectively. Further, the MCU 1003 exchanges information with the DSP 1005 and can access an optionally incorporated SIM card 1049 and a memory 1051. In addition, the MCU 1003 executes various control functions required of the terminal. The DSP 1005 may, depending upon the implementation, perform any of a variety of conventional digital processing functions on the voice signals. Additionally, DSP 1005 determines the background noise level of the local environment from the signals detected by microphone 1011 and sets the gain of microphone 1011 to a level selected to compensate for the natural tendency of the user of the mobile terminal 1001.

The CODEC 1013 includes the ADC 1023 and DAC 1043. The memory 1051 stores various data including call incoming tone data and is capable of storing other data including music data received via, e.g., the global Internet. The software module could reside in RAM memory, flash memory, registers, or any other form of writable storage medium known in the art. The memory device 1051 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1049 carries, for instance, important information, such as the cellular phone number, the carrier supplying service, subscription details, and security information. The SIM card 1049 serves primarily to identify the mobile terminal 1001 on a radio network. The card 1049 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
receiving, by an apparatus, first data originating from a first user, a first user identifier, or a combination thereof at a network service;
determining, by the apparatus, one or more second user identifiers associated with the first data based, at least in part, on sensor data indicating at least one real-world physical spatial vicinity between a first device associated with the first user identifier and one or more second devices associated with the one or more second user identifiers when the first data and the sensor data are captured by the first device;
granting, by the apparatus based at least in part on the determination, an ownership right for the first data to at least one second user identified by the one or more second user identifiers, wherein the ownership right includes a right to control posting of the first data in the network service;
causing, at least in part, a transmission of a notification of the ownership right to at least one of the second devices associated with the at least one second user;
receiving, from at least one of the second devices, a remove request of the first data from one or more posts in the network service;
authenticating the remove request based, at least in part, on an exercise of the ownership right; and
executing the remove request of the first data based on the authentication.

2. A method of claim 1, further comprising:
presenting controlled posting of the first data to devices in the network service,
wherein the ownership right includes a right to limit posting of the first data in the network service.

3. A method of claim 1, further comprising:
determining that the first data captures the at least one second user at the at least one real-world physical spatial vicinity,
wherein the ownership right includes a right to remove the first data from one or more profiles of the first user, the first user identifier, or a combination thereof in the network service.

4. A method of claim 3, further comprising:
determining at least one of the second devices associated with the at least one second user is in a local radio communication range of the first device when the first data is captured,
wherein the at least one second user is not yet subscribed to data posting in the network service.

5. A method of claim 4, further comprising:
causing, at least in part, a transmission of a secret associated with the exercise of the ownership right to the at least one of the second devices.

6. A method of claim 5,
wherein the remove request includes the secret, and the remove request is authenticated based, at least in part, on the secret.

7. A method of claim 3, further comprising:
receiving votes from the at least one second user regarding whether to post or remove the first data into the one or more profiles of the first user; and
determining whether to post or remove the first data based on all of the votes received and a unanimous result, a majority of the votes to post or remove, a majority of responding votes to post or remove, or a majority of a quorum of the votes to post or remove,
wherein the one or more profile pages of the first user are associated with one or more social network services.

8. An apparatus comprising:
at least one processor; and
at least one memory including computer program code for one or more programs,
the at least one memory and the computer program code configured to, with the at least one processor, cause the apparatus to perform at least the following,
receive first data originating from a first user, a first user identifier, or a combination thereof at a network service;
determine one or more second user identifiers associated with the first data based, at least in part, on sensor data indicating at least one real-world physical spatial vicinity between a first device associated with the first user identifier and one or more second devices associated with the one or more second user identifiers when the first data and the sensor data are captured by the first device;
grant, based at least in part on the determination, an ownership right for the first data to at least one second user identified by the one or more second user identifiers, wherein the ownership right includes a right to control posting of the first data in the network service;

cause, at least in part, a transmission of a notification of the ownership right to at least one of the second devices associated with the at least one second user;

receive, from at least one of the second devices, a remove request of the first data from one or more posts in the network service;

authenticate the remove request based, at least in part, on an exercise of the ownership right; and execute the remove request of the first data based on the authentication.

9. An apparatus of claim 8, wherein the apparatus is further caused to:

present controlled posting of the first data to devices in the network service, wherein the ownership right includes a right to limit posting of the first data in the network service.

10. An apparatus of claim 8, wherein the apparatus is further caused to:

determine that the first data captures the at least one second user at the at least one real world physical spatial vicinity, wherein the ownership right includes a right to remove the first data from one or more profiles of the first user, the first user identifier, or a combination thereof in the network service.

11. An apparatus of claim 10, wherein the apparatus is further caused to:

determine at least one of the second devices associated with the at least one second user is in a local radio communication range of the first device when the first data is captured, wherein the at least one second user is not yet subscribed to data posting in the network service.

12. An apparatus of claim 11, wherein the apparatus is further caused to:

cause, at least in part, a transmission of a secret associated with the exercise of the ownership right to the at least one of the second devices.

13. An apparatus of claim 12, wherein the remove request includes the secret, and the remove request is authenticated based, at least in part, on the secret.

14. An apparatus of claim 10, wherein the apparatus is further caused to:

receive votes from the at least one second user regarding whether to post or remove the first data into the one or more profiles of the first user; and determine whether to post or remove the first data based on all of the votes received and a unanimous result, a majority of the votes to post or remove, a majority of responding votes to post or remove, or a majority of a quorum of the votes to post or remove, wherein the one or more profile pages of the first user are associated with one or more social network services.

15. A non-transitory computer-readable storage medium carrying one or more sequences of one or more instructions which, when executed by one or more processors, cause an apparatus to at least perform the following steps:

receiving first data originating from a first user, a first user identifier, or a combination thereof at a network service;

determining one or more second user identifiers associated with the first data based, at least in part, on sensor data indicating at least one real-world physical spatial vicinity between a first device associated with the first user identifier and one or more second devices associated with the one or more second user identifiers when the first data and the sensor data are captured by the first device;

granting, based at least in part on the determination, an ownership right for the first data to at least one second user identified by the one or more second user identifiers, wherein the ownership right includes a right to control posting of the first data in the network service;

causing, at least in part, a transmission of a notification of the ownership right to at least one of the second devices associated with the at least one second user;

receiving, from at least one of the second devices, a remove request of the first data from one or more posts in the network service;

authenticating the remove request based, at least in part, on an exercise of the ownership right; and executing the remove request of the first data based on the authentication.

16. A non-transitory computer-readable storage medium of claim 15, wherein the apparatus is caused to further perform:

presenting controlled posting of the first data to devices in the network service, wherein the ownership right includes a right to limit posting of the first data in the network service.

17. A non-transitory computer-readable storage medium of claim 15, wherein the apparatus is caused to further perform:

determining that the first data captures the at least one second user at the at least one real-world physical spatial vicinity, wherein the ownership right includes a right to remove the first data from one or more profiles of the first user, the first user identifier, or a combination thereof in the network service.

18. A non-transitory computer-readable storage medium of claim 17, wherein the apparatus is caused to further perform:

determining at least one of the second devices associated with the at least one second user is in a local radio communication range of the first device when the first data is captured, wherein the at least one second user is not yet subscribed to data posting in the network service.

19. A non-transitory computer-readable storage medium of claim 18, wherein the apparatus is caused to further perform:

causing, at least in part, a transmission of a secret associated with the exercise of the ownership right to the at least one of the second devices.

20. A non-transitory computer-readable storage medium of claim 19, wherein the remove request includes the secret, and the remove request is authenticated based, at least in part, on the secret.

* * * * *